(12) United States Patent
Hirasaka et al.

(10) Patent No.: US 9,793,762 B2
(45) Date of Patent: Oct. 17, 2017

(54) WIRELESS POWER TRANSMISSION APPARATUS

(71) Applicant: SONY CORPORATION, Tokyo (JP)

(72) Inventors: Hisato Hirasaka, Tokyo (JP);
Toshiyuki Hirose, Kanagawa (JP);
Toshihiko Hirose, Kanagawa (JP);
Tetsuro Makise, Tokyo (JP); Akira Itou, Tokyo (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 15/054,114

(22) Filed: Feb. 25, 2016

(65) Prior Publication Data

US 2016/0181872 A1 Jun. 23, 2016

Related U.S. Application Data

(63) Continuation of application No. 13/016,582, filed on Jan. 28, 2011, now Pat. No. 9,300,145.

(30) Foreign Application Priority Data

Feb. 5, 2010 (JP) .................................. 2010-024478

(51) Int. Cl.
*H01F 37/00* (2006.01)
*H02J 50/10* (2016.01)
(Continued)

(52) U.S. Cl.
CPC .............. *H02J 50/10* (2016.02); *H02J 5/005* (2013.01); *H02J 17/00* (2013.01); *H02J 50/12* (2016.02); *H02J 50/80* (2016.02); *H04K 1/10* (2013.01); *H04W 12/06* (2013.01); *H04L 63/0442* (2013.01); *H04L 63/083* (2013.01); *Y04S 40/24* (2013.01)

(58) Field of Classification Search
CPC .. H02J 50/10; H02J 50/80; H02J 50/12; H02J 5/005
See application file for complete search history.

(56) References Cited

U.S. PATENT DOCUMENTS 6,427,065 B1 7/2002 Suga et al.
8,482,157 B2 * 7/2013 Cook ...................... H02J 7/025
307/104

(Continued)

FOREIGN PATENT DOCUMENTS

CN 101189624 A 5/2008
CN 101577446 A 11/2009
(Continued)

*Primary Examiner* — Daniel Cavallari
(74) *Attorney, Agent, or Firm* — Michael Best & Friedrich LLP

(57) ABSTRACT

A wireless power transmission apparatus includes: a transmitter that wirelessly transmits electric power; and a receiver that can receive, in a resonant relation with the transmitter, a transmission signal including the electric power transmitted from the transmitter, wherein the receiver includes a frequency variable unit that can change a reception resonant frequency; a detecting unit that detects reception power; and a control unit that controls the frequency variable unit to perform frequency adjustment such that the reception power detected by the detecting unit is maximized.

15 Claims, 35 Drawing Sheets

(51) Int. Cl.
*H02J 5/00* (2016.01)
*H02J 17/00* (2006.01)
*H04K 1/10* (2006.01)
*H02J 50/12* (2016.01)
*H02J 50/80* (2016.01)
*H04W 12/06* (2009.01)
*H04L 29/06* (2006.01)

(56) References Cited

U.S. PATENT DOCUMENTS

2009/0284082 A1   11/2009  Mohammadian
2011/0127845 A1*  6/2011  Walley .................... H02J 5/005
                                                            307/104

FOREIGN PATENT DOCUMENTS

| JP | 2006-517778 A | 7/2006 |
| JP | 2008-061432 A | 3/2008 |
| JP | 2008206233 A | 9/2008 |
| JP | 2008295191 A | 12/2008 |
| JP | 2009106136 A | 5/2009 |
| JP | 2009-261104 A | 11/2009 |
| JP | 2010-028934 A | 2/2010 |

* cited by examiner

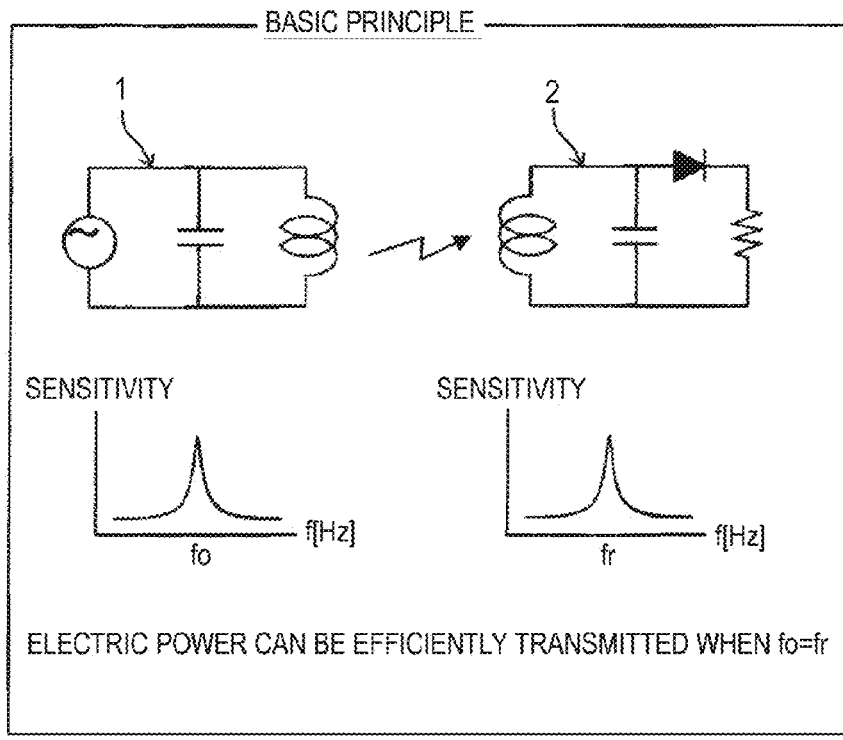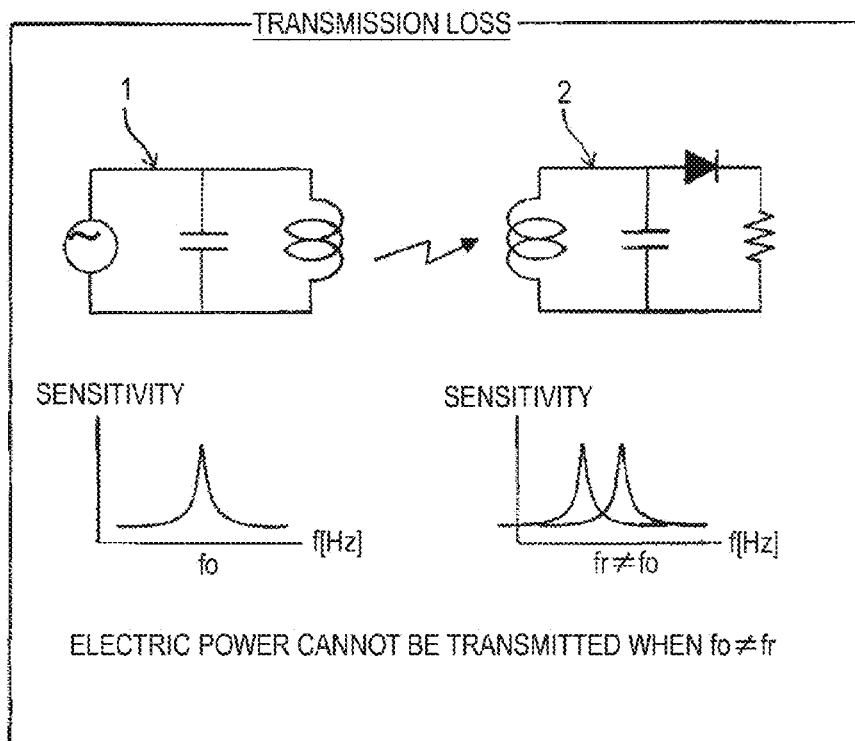

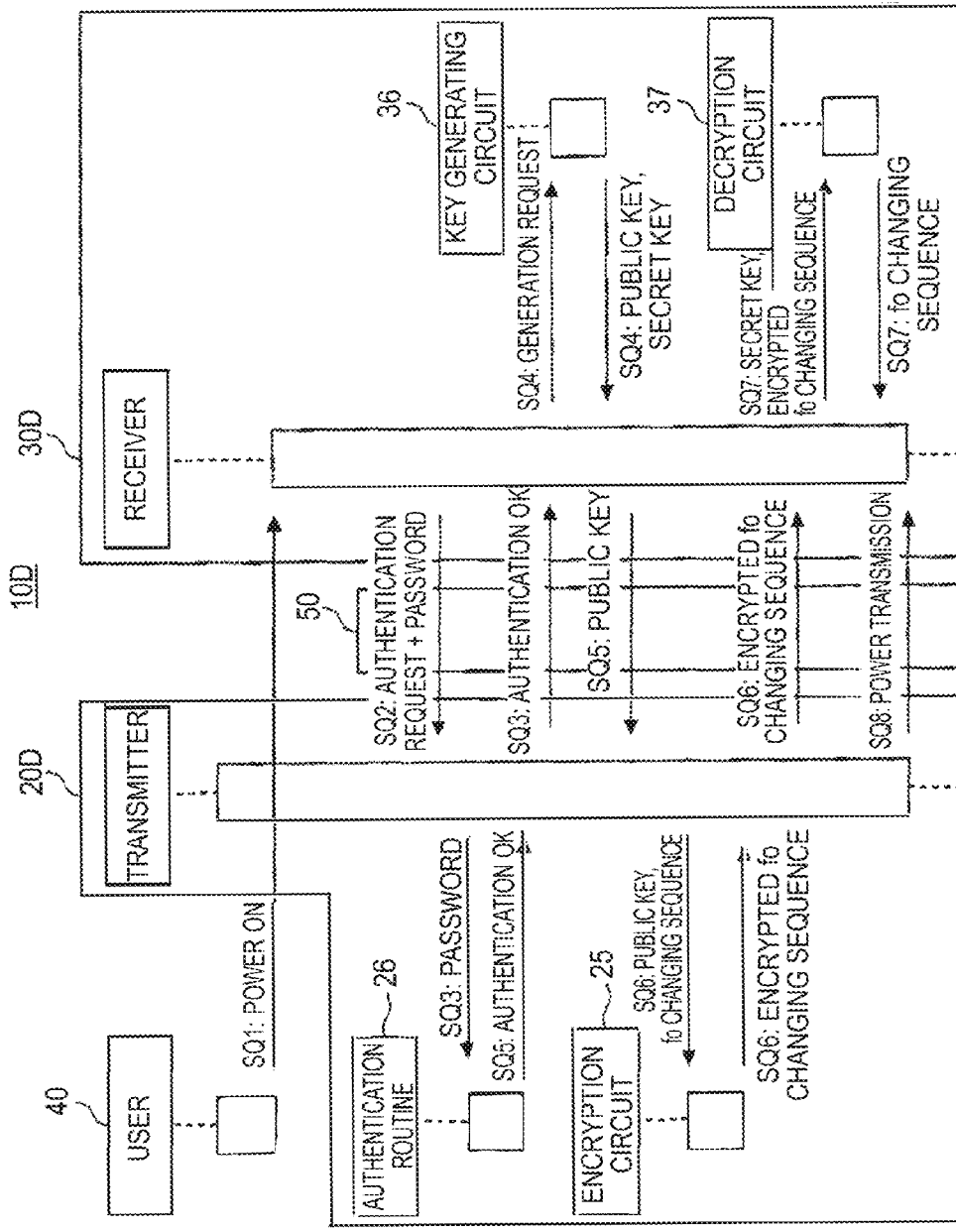

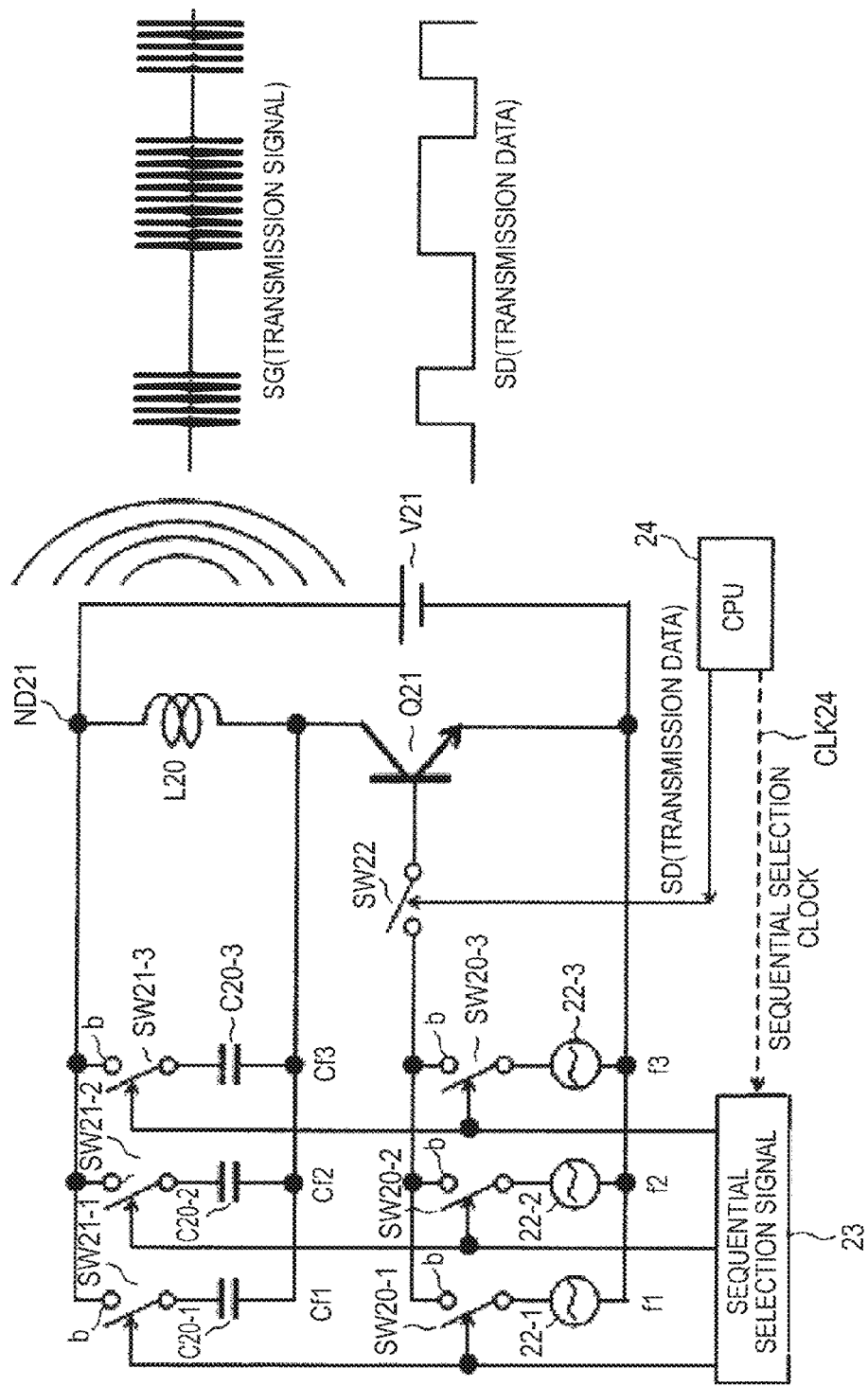

WIRELESS POWER TRANSMISSION APPARATUS

BACKGROUND OF THE INVENTION

1. Field of the Invention

The present invention relates to a wireless power transmission apparatus that wirelessly transmits electric power.

2. Description of the Related Art

An electromagnetic induction system is known as a system for wirelessly feeding electric power. In recent years, a wireless power feed and charging system employing a system called magnetic resonance system that makes use of a magnetic resonance phenomenon attracts attention.

At present, in a non-contact power feeding system of the electromagnetic induction system already in wide use, a power feeding source and a power feeding destination (a power receiving side) need to share magnetic fluxes. It is necessary to arrange the power feeding source and the power feeding destination extremely close to each other to efficiently feed electric power. Further, axis alignment for coupling is important.

On the other hand, in a non-contact power feeding system that makes use of the magnetic resonant phenomenon, because of the principle of the magnetic resonance phenomenon, there are advantages that power transmission can be performed with a power feeding source and a power feeding destination arranged farther apart from each other than those in the electromagnetic induction system and transmission efficiency is not very deteriorated even if axis alignment is somewhat poor.

Besides the magnetic resonance system, there is also an electric resonance system as a resonance system that makes use of the electromagnetic resonance phenomenon.

For example, JP-A-2001-185939 discloses a wireless power feed system employing the magnetic resonance system.

In the technique disclosed in JP-A-2001-185939, electric power is transmitted from a power feeding coil, which is connected to a power feeding circuit, to a resonant coil by electromagnetic induction. Adjustment of a frequency is performed by a capacitor and a resistor connected to the resonant coil.

In recent years, a wireless power transmission technique is reported that, employing the magnetic resonance system that makes use of a resonance phenomenon of a magnetic field, realizes power transmission of 60 W at a distance of 2 m.

The development of a highly efficient "wireless power feed system" is reported that, employing the magnetic resonant system, transmits electric power of 60 W and drives an electronic apparatus arranged at a distance of 50 cm.

In this wireless power transmission technique, since wireless power transmission of several tens watts can be performed at a distance of several meters, the application of the wireless power transmission technique to new concept appliances in offices and homes is expected.

SUMMARY OF THE INVENTION

However, in putting the wireless power transmission to practical use, there are problems explained below.

a) The resonant frequencies of a transmitter and a receiver do not completely coincide with each other.

b) Since electric power of several tens watts is wirelessly transmitted, it is likely that peripheral apparatuses are affected.

c) Since electric power of several tens watts is wirelessly transmitted, the electric power is fed to unintended apparatuses.

These problems are explained more in detail.

"a) The problem in that the resonant frequencies of a transmitter and a receiver do not completely coincide with each other"

In this power transmission principle, as shown in FIG. 1, the resonant frequencies on a transmitter 1 side and a receiver 2 side need to coincide with each other.

However, as shown in FIG. 2, for example, when a reception resonant frequency shifts, it is likely that a transmission loss increases, transmission efficiency is deteriorated, and it is difficult to use the receiver 2.

"b) The problem in that, since electric power of several tens watts is wirelessly transmitted, peripheral apparatuses are affected"

If an apparatus having resonant frequencies in a relation of fr=fo is present regardless of the fact that power reception is not intended, it is likely that electric power of several tens watts is generated in a resonant circuit of the apparatus.

When the resonant circuit may not be able to withstand the electric power of several tens watts, risks such as heating of the circuit and damages to the circuit are involved.

"c) The problem in that, since electric power of several tens watts is wirelessly transmitted, the electric power is fed to unintended apparatuses"

In this transmission system, any apparatus present within a distance range in which electric power can be transmitted can equally receive the electric power.

This means that unrelated people can receive the electric power without permission.

Therefore, it is desirable to provide a wireless power transmission apparatus that can prevent deterioration in power transmission efficiency, prevent influence on other apparatuses, and prevent unnecessary electric power from being provided to unintended apparatuses.

According to an embodiment of the present invention, there is provided a wireless power transmission apparatus including: a transmitter that wirelessly transmits electric power; and a receiver that can receive, in a resonant relation with the transmitter, a transmission signal including the electric power transmitted from the transmitter, wherein the receiver includes: a frequency variable unit that can change a reception resonant frequency; a detecting unit that detects reception power; and a control unit that controls the frequency variable unit to perform frequency adjustment such that the reception power detected by the detecting unit is maximized.

According to the embodiment of the present invention, it is possible to prevent deterioration in power transmission efficiency, prevent influence on other apparatuses, and prevent unnecessary electric power from being provided to unintended apparatuses.

BRIEF DESCRIPTION OF THE DRAWINGS

FIG. 1 is a diagram for explaining a basic principle of wireless power transmission by a magnetic resonance system;

FIG. 2 is a diagram for explaining a transmission loss of the wireless power transmission by the magnetic resonance system;

FIG. 25 is a diagram of the configuration of a wireless power transmission apparatus according to a fifth embodiment of the present invention;

FIG. 26 is a diagram of an example of a transmitter having a modulating function according to a sixth embodiment of the present invention;

DESCRIPTION OF THE PREFERRED EMBODIMENTS

Embodiments of the present invention are explained below in association with the drawings.
1. First Embodiment
2. Second Embodiment
3. Third Embodiment 4. Fourth Embodiment
5. Fifth Embodiment
6. Sixth Embodiment
7. Seventh Embodiment
8. Eighth Embodiment
9. Ninth Embodiment
10. Tenth Embodiment
11. Eleventh Embodiment
12. Twelfth Embodiment
13. Thirteenth Embodiment
14. Fourteenth Embodiment <1. First Embodiment>

Figure 3:
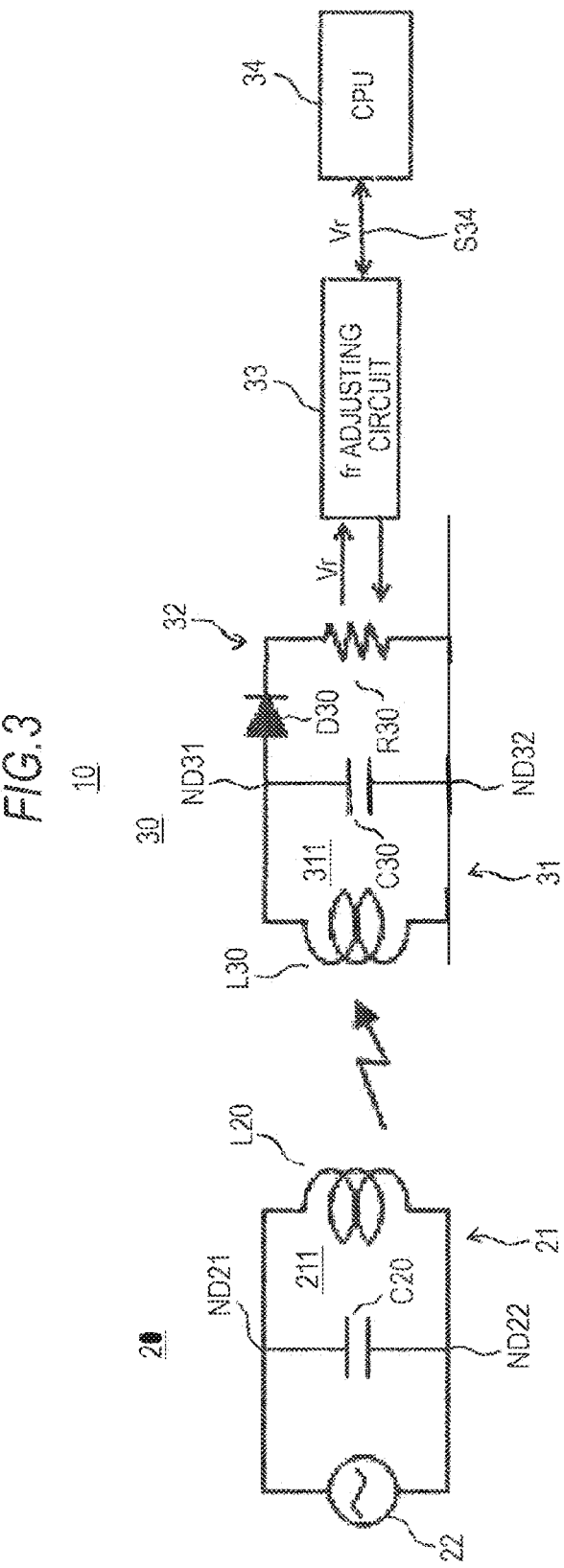
FIG. 3 is a diagram of a basic configuration of a wireless power transmission apparatus according to a first embodiment of the present invention.

FIG. 3 is a diagram of a basic configuration of a wireless power transmission apparatus according to a first embodiment of the present invention.

Figure 4:
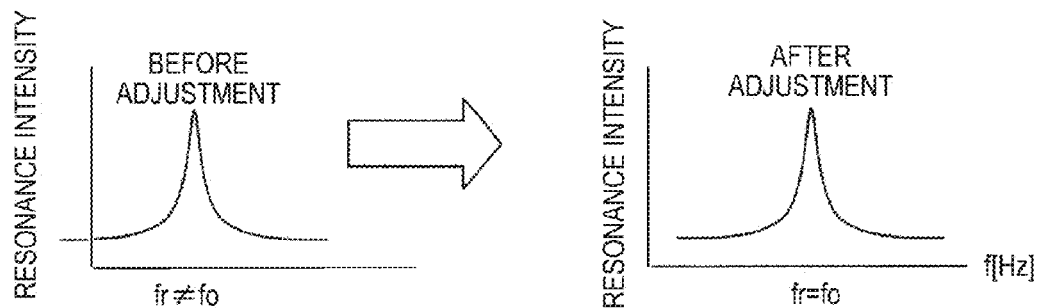
FIG. 4 is a diagram for explaining an automatic adjustment function for equalizing a reception antenna resonant frequency in a receiver with a transmission antenna resonant frequency according to the first embodiment.

FIG. 4 is a diagram for explaining an automatic adjustment function for equalizing a reception antenna resonant frequency in a receiver with a transmission antenna resonant frequency according to the first embodiment.

A wireless power transmission apparatus 10 includes a transmitter 20 and a receiver 30.

The wireless power transmission apparatus 10 has, on the receiver 30 side, a function of automatically changing a reception antenna resonant frequency fr to equalize a transmission antenna resonant frequency fo of the transmitter 20 and the reception antenna resonant frequency fr of the receiver 30.

The transmitter 20 includes a transmission antenna unit 21 and a high-frequency generating circuit for power transmission 22.

The transmission antenna unit 21 equivalently includes an inductor (coil) L20 and a capacitor C20 connected in parallel that form a resonant circuit (a tank circuit) 211.

A node ND 21 is formed by a connection point of one end of the inductor L20 and one end of the capacitor C20. A node ND 22 is formed by a connection point of the other end of the inductor L20 and the other end of the capacitor C20.

The resonant frequency of the resonant circuit 211 is set to fo.

The high-frequency generating circuit for power transmission 22 generates an AC power signal (a transmission signal), which should be transmitted, and supplies the AC power signal to the transmission antenna unit 21.

In the transmitter 20, the equivalently-shown inductor L20 of the resonant circuit 211 functions as a resonant coil of the magnetic resonance system. When the self-resonant frequency of the inductor L20 and the self-resonant frequency of the inductor L30, which is a resonant coil of the receiver 30, coincide with each other, the inductors L20 and L30 are in a magnetic resonant relation and efficiently transmit electric power.

The receiver 30 has a function of automatically adjusting, in order to make power transmission efficient, the transmission antenna resonant frequency fo of the transmitter 20 and the reception antenna resonant frequency fr of the receiver 30 to be equal, i.e., fr=fo as shown in FIG. 4.

The receiver 30 includes a reception antenna unit 31, a rectifying unit 32, a reception-antenna-resonant-frequency adjusting circuit (fr adjusting circuit) 33, and a CPU 34 as a control unit.

The reception antenna unit 31 equivalently includes an inductor L30 and a capacitor C30 connected in parallel that form a resonant circuit 311.

A node ND 31 is formed by a connection point of one end of the inductor L30 and one end of the capacitor C30. A node ND 32 is formed by a connection point of the other end of the inductor L30 and the other end of the capacitor C30.

The resonant frequency of the resonant circuit 311 is set (adjusted) to fr.

In the receiver 30, the equivalently-shown inductor L30 of the resonant circuit 311 functions as a resonant coil of the magnetic resonance system. When the self-resonant frequency of the inductor L30 and the self-resonant frequency of the inductor L20, which is the resonant coil of the transmitter 20, coincide with each other, the inductors L30 and L20 are in a magnetic resonant relation and efficiently transmit electric power.

The rectifying unit 32 rectifies AC power received by the reception antenna unit 31 into a reception voltage Vr, which is DC power (voltage), and feeds the reception voltage Vr to the fr adjusting circuit 33.

The rectifying unit 32 includes a diode D30 and a load resistance element R30.

An anode of the diode D30 is connected to the connection node ND 31 of one end of the inductor L30 and one end of the capacitor C30 of the resonant circuit 311. A cathode of the diode D30 is connected to the load resistance element R30.

The fr adjusting circuit 33 adjusts, according to a control signal S34 generated by the CPU 34, the reception antenna resonant frequency fr of the reception antenna unit 31 to be equal to the transmission antenna resonant frequency fo on the transmitter 20 side.

In other words, the fr adjusting circuit 33 adjusts, according to the control signal S34, the reception antenna resonant frequency fr to maximize the reception voltage Vr.

Figure 5:
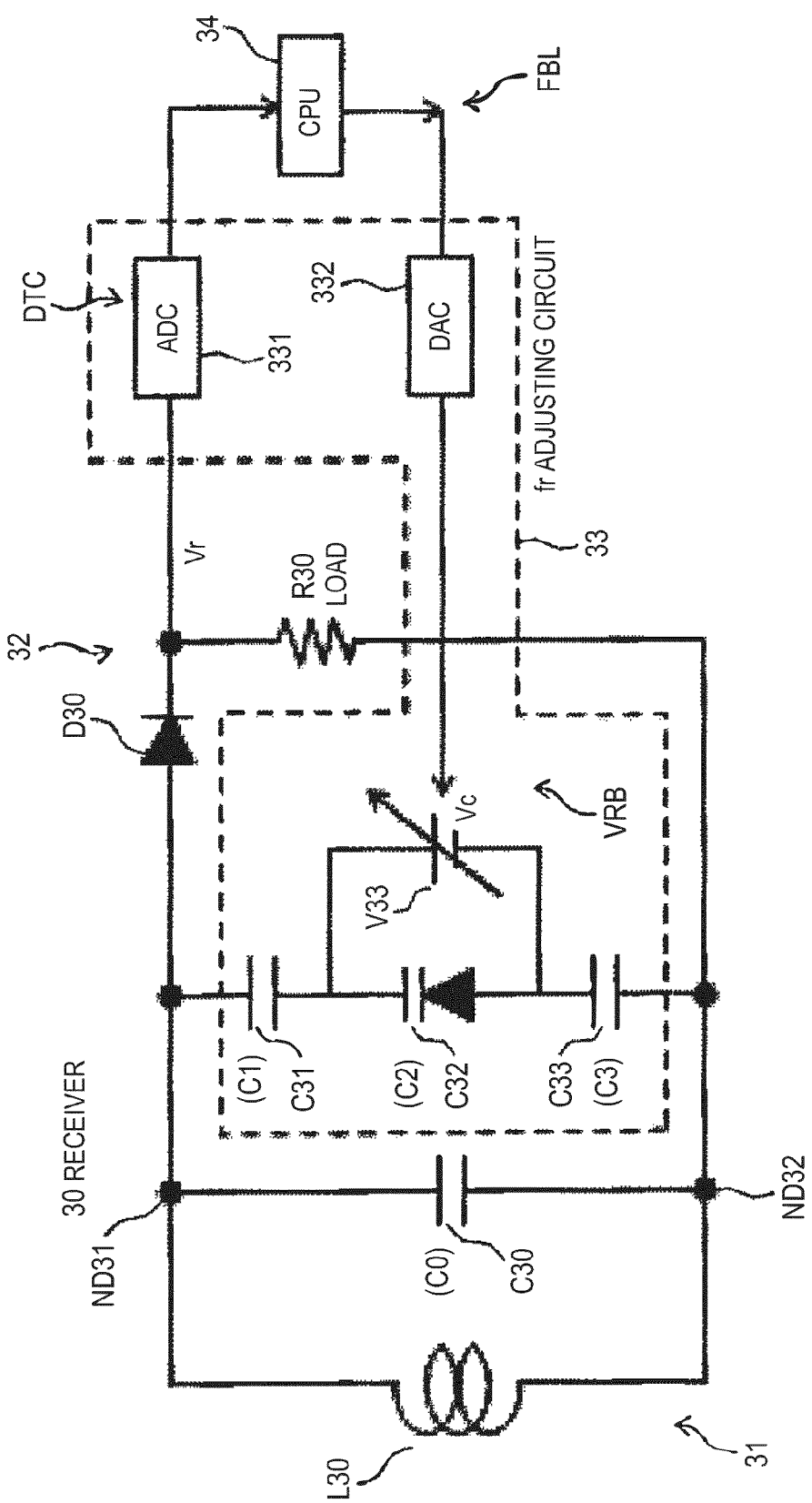
FIG. 5 is a diagram of a configuration example of a reception-antenna-resonant-frequency (fr) adjusting circuit in the receiver according to the first embodiment.

FIG. 5 is a diagram of a configuration example of a configuration example of the reception-antenna-resonant-frequency (fr) adjusting circuit in the receiver according to the first embodiment.

The fr adjusting circuit 33 shown in FIG. 5 includes an analog-to-digital converter (ADC) 331, a digital-to-analog converter (DAC) 332, a variable voltage source V33, and capacitors C31, C32, and C33.

The capacitor C32 is formed by a so-called varicap diode.

The capacitors C31, C32, and C33 are connected in parallel to the capacitor C30 and in series between nodes ND31 and ND32.

The capacitance of the capacitor C30 is set to C0, the capacitance of the capacitor C31 is set to C1, the capacitance of the capacitor C32 is set to C2, and the capacitance of the capacitor C33 is set to C3.

A voltage value of the variable voltage source V33 is Vc.

In the fr adjusting circuit 33, an fr variable unit VRB is formed by the varicap diode C32, the variable voltage source V33, and the DAC 332. A detecting unit DTC for a reception voltage is formed by the ADC 331 (the CPU 34).

A loop circuit of the ADC 331, the DAC 332, and the variable voltage source V33 including the CPU 34 is formed as a feedback loop FBL for adjusting the reception antenna resonant frequency fr to maximize the reception voltage.

The reception antenna resonant frequency fr is given by the following formula:

$$fr = 1/2\pi\sqrt{LC}$$

where, L indicates the inductance of the inductor L30 and C indicates combined capacitance of the capacitances C0, C1, and C2 of the capacitors C30, C31, C32, and C34.

The capacitance C2 of the varicap diode C32 has a characteristic that, when the voltage Vc of the variable power supply V33 increases, the capacitance C2 decreases.

Therefore, when the voltage Vc is increased, the reception antenna resonant frequency fr rises and, when the voltage Vc is reduced, the reception antenna resonant frequency fr falls.

As a result, when the CPU 34 sets a large value in the DAC 332, the reception antenna resonant frequency fr rises and, when the CPU 34 sets a small value in the DAC 332, the reception antenna resonant frequency fr falls.

Figure 6:
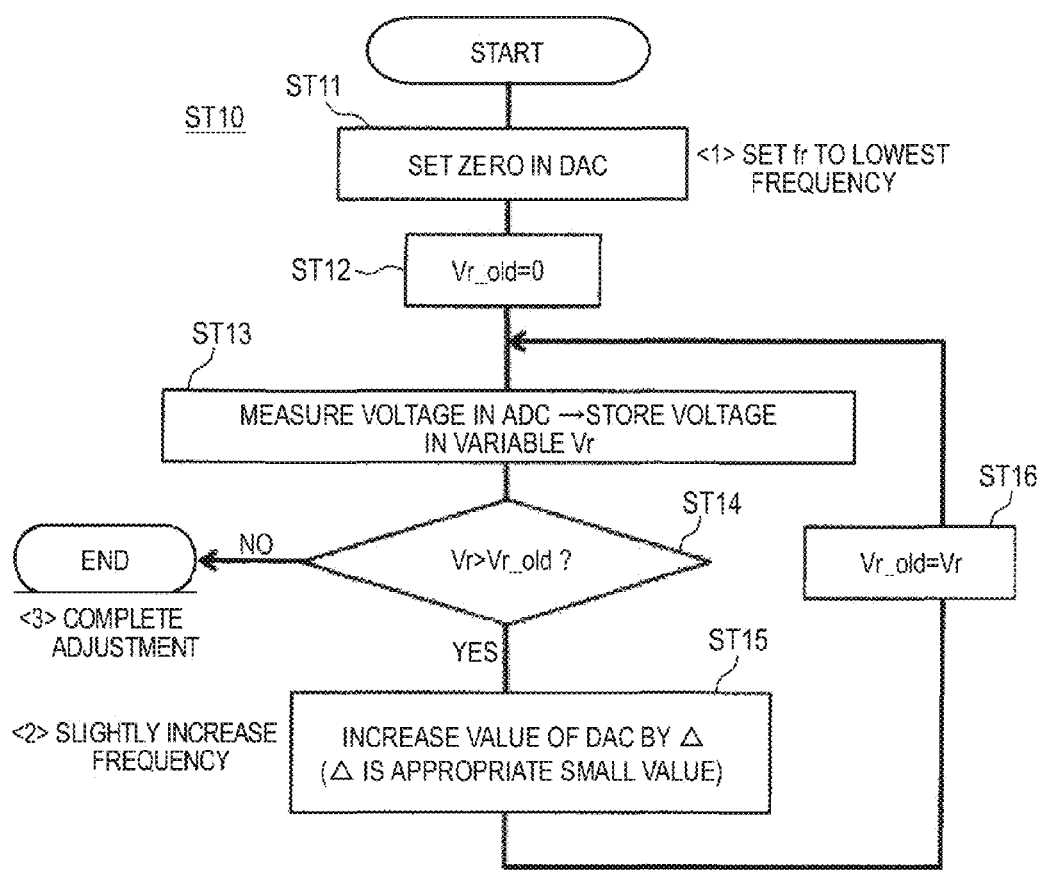
FIG. 6 is a flowchart for explaining control processing by a CPU for controlling a feedback loop of the fr adjusting circuit and adjusting the reception antenna resonant frequency according to the first embodiment.

FIG. 6 is a flowchart for explaining control processing by the CPU for controlling the feedback loop of the fr adjusting circuit and automatically adjusting the reception antenna resonant frequency fr according to the first embodiment.

Figure 7:
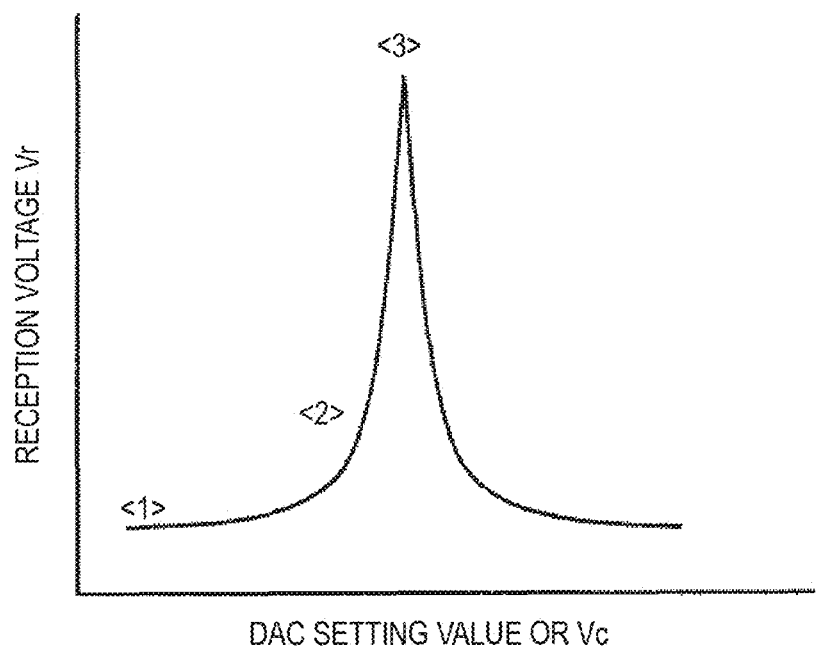
FIG. 7 is a diagram for explaining a relation between a DAC setting value corresponding to the control processing shown in FIG. 6 or a variable voltage and a reception voltage.

FIG. 7 is a diagram of a relation between a DAC setting value corresponding to the control processing shown in FIG. 6 or the variable voltage Vc and the reception voltage Vr.

An fr automatic adjustment flow ST10 by the CPU 34 shown in FIG. 6 is explained.

It is assumed that the capacitance of the varicap diode C32 changes according to the variable voltage Vc and, when the variable voltage Vc increases, the capacitance C2 of the varicap diode C32 decreases and, therefore, the reception antenna resonant frequency fr rises.

[Step ST11]

First, in step ST11, the CPU 34 sets the DAC 332 to zero.

Consequently, the CPU 34 sets the reception antenna resonant frequency fr to the lowest frequency.

[Step ST12]

In step ST12, the CPU 34 sets a variable Vr_old to 0.

[Step ST13]

In step ST13, the CPU 34 detects (measures) a value of the reception voltage Vr from an output of the ADC 331 and stores the value in a variable Vr.

[Step ST14]

In step ST14, the CPU 34 determines whether a value of the variable Vr is larger than the variable Vr_old.

This stage is a halfway stage of the automatic adjustment indicated by signs <1> and <2> shown in FIG. 7. In step ST14, the CPU 34 determines that the value of the variable Vr is larger than the variable Vr_old.

In step ST14, the automatic adjustment processing advances. At a point of a stage indicated by sign <3> shown in FIG. 7, the CPU 34 determines that the value of the variable Vr is smaller than the variable Vr_old. The automatic adjustment processing ends.

[Step ST15]

In step ST15, the CPU 34 increases a value of the DAC 332 by Δ. Δ is an appropriate small value.

Consequently, the CPU 34 slightly increases the reception antenna resonant frequency fr.

[Step ST16]

In step ST16, the CPU 34 substitutes the value of the variable Vr in the variable Vr_old. The CPU 34 returns to the processing in step ST13 and repeats the processing in steps ST13 to ST16.

As explained above, the automatic adjustment processing advances and, in step ST14, in the state indicated by sign <3> shown in FIG. 7, the CPU 34 determines that the value of the variable Vr is smaller than the variable Vr_old. The automatic adjustment processing ends.

In this way, in order to maximize transmission efficiency, the reception antenna resonant frequency fr is automatically adjusted to equalize the reception antenna resonant frequency fr with the transmission antenna resonant frequency fo.

According to the first embodiment, it is possible to prevent deterioration in transmission efficiency and realize power transmission with maximum transmission efficiency under a power transmission environment.

<2. Second Embodiment>

Figure 8:
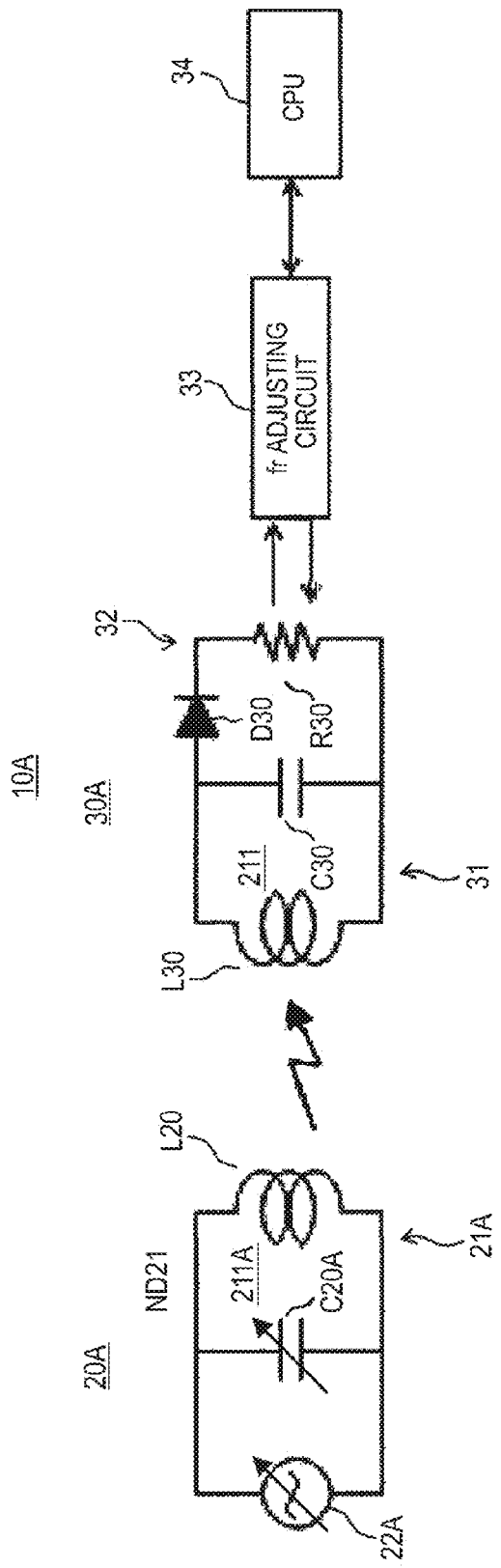
FIG. 8 is a diagram of a basic configuration of a wireless power transmission apparatus according to a second embodiment of the present invention.

FIG. 8 is a diagram of a basic configuration of a wireless power transmission apparatus according to a second embodiment of the present invention.

A wireless power transmission apparatus 10A according to the second embodiment is different from the wireless power transmission apparatus 10 according to the first embodiment as explained below.

In the wireless power transmission apparatus 10A, a transmitter 20A changes the transmission antenna resonant frequency fo and a receiver 30A causes the reception antenna resonant frequency fr to follow the changed transmission antenna resonant frequency fo.

Figure 9:
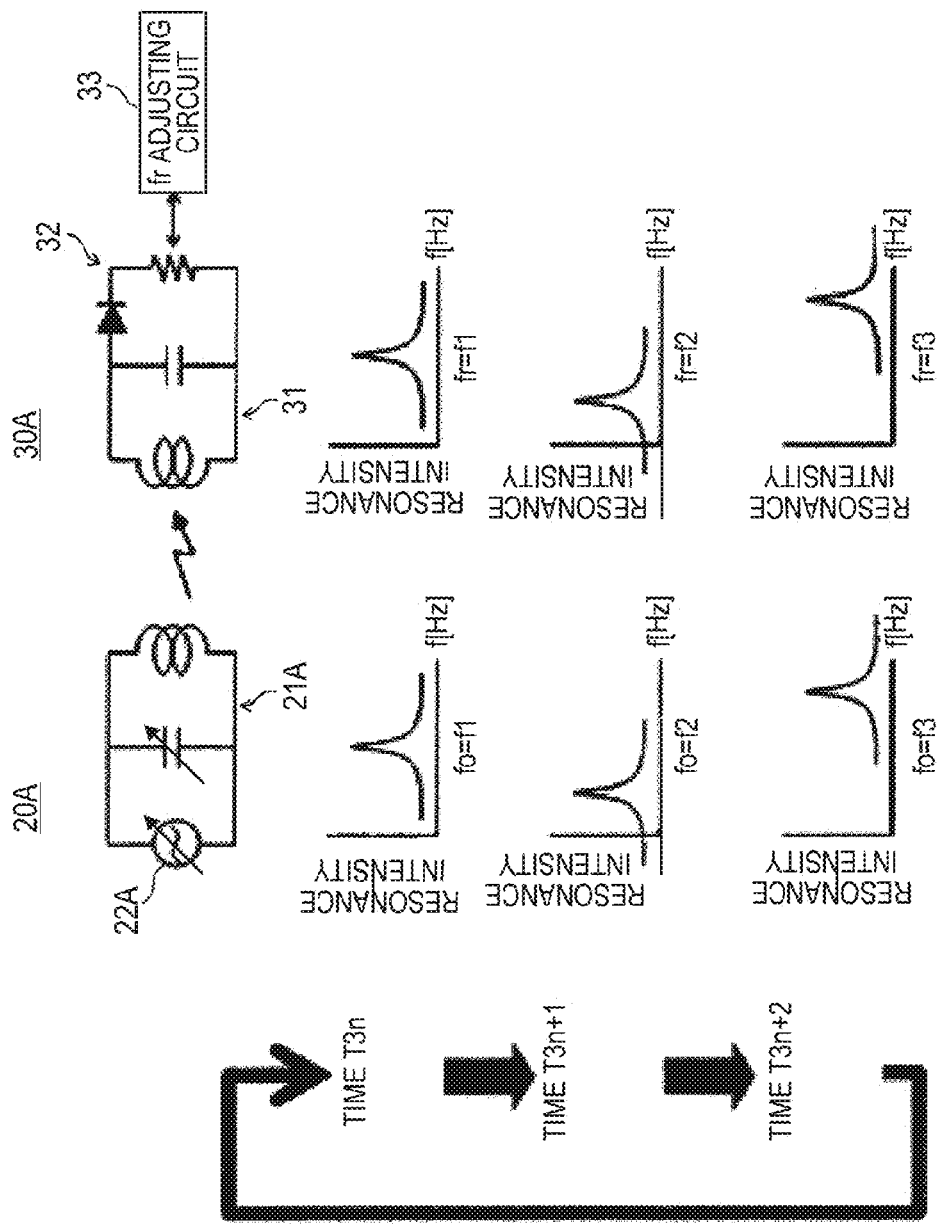
FIG. 9 is a schematic diagram for explaining processing for causing a reception antenna resonant frequency to follow a change in the transmission and reception antenna resonant frequencies of the wireless power transmission apparatus according to the second embodiment.

FIG. 9 is a schematic diagram for explaining processing for causing the reception antenna resonant frequency to follow a change in the transmission antenna resonant frequency of the wireless power transmission apparatus according to the second embodiment.

In an example shown in FIG. 9, three frequencies f1, f2, and f3 are switched in order.

At time T3$n$, the transmitter 20A sets the transmission antenna resonant frequency fo to f1. According to the setting of the transmission antenna resonant frequency fo, the receiver 30A controls the reception antenna resonant frequency fr to follow the frequency f1.

At time T3$n$+1, the transmitter 20A sets the transmission antenna resonant frequency fo to f2. According to the setting of the transmission antenna resonant frequency fo, the receiver 30A controls the reception antenna resonant frequency fr to follow the frequency f2.

At time T3$n$+2, the transmitter 20A sets the transmission antenna resonant frequency fo to f3. According to the setting of the transmission antenna resonant frequency fo, the receiver 30A controls the reception antenna resonant frequency fr to follow the frequency f3.

The sequence explained above is repeatedly performed.

A configuration example in which a resonant frequency can be changed is explained in detail later.

By performing the control as explained above, for example, even if an apparatus having the resonant frequency f1 is placed nearby, it is possible to reduce electric power generated in a resonant circuit of the apparatus to ⅓ and reduce a risk of occurrence of heat generation or the like.

If the variety of a frequency is expanded from f1 to fN, it is possible to reduce electric power generated in the resonant circuit of the apparatus placed nearby to 1/N and further reduce the risk.

A frequency switching period does not need to be a fixed period.

In the wireless power transmission apparatus 10A according to the second embodiment, as in the wireless power transmission apparatus 10 according to the first embodiment, electric power can be efficiently transmitted when the transmission antenna resonant frequency fo and the reception antenna resonant frequency fr are equal.

In the second embodiment, the transmission antenna resonant frequency fo sequentially changes. However, since the reception antenna resonant frequency fr also changes following the transmission antenna resonant frequency fo, transmission efficiency is not deteriorated.

As explained above, even if the apparatus having the resonant frequency f1 is present nearby, since the resonant frequency on the transmission side changes in the order of f1, f2, and f3 every moment, it is possible to suppress influence on the nearby apparatus and the risk of heating or the like is reduced.

A specific configuration example for changing the transmission antenna resonant frequency in the transmitter 20A is explained.

Figure 10:
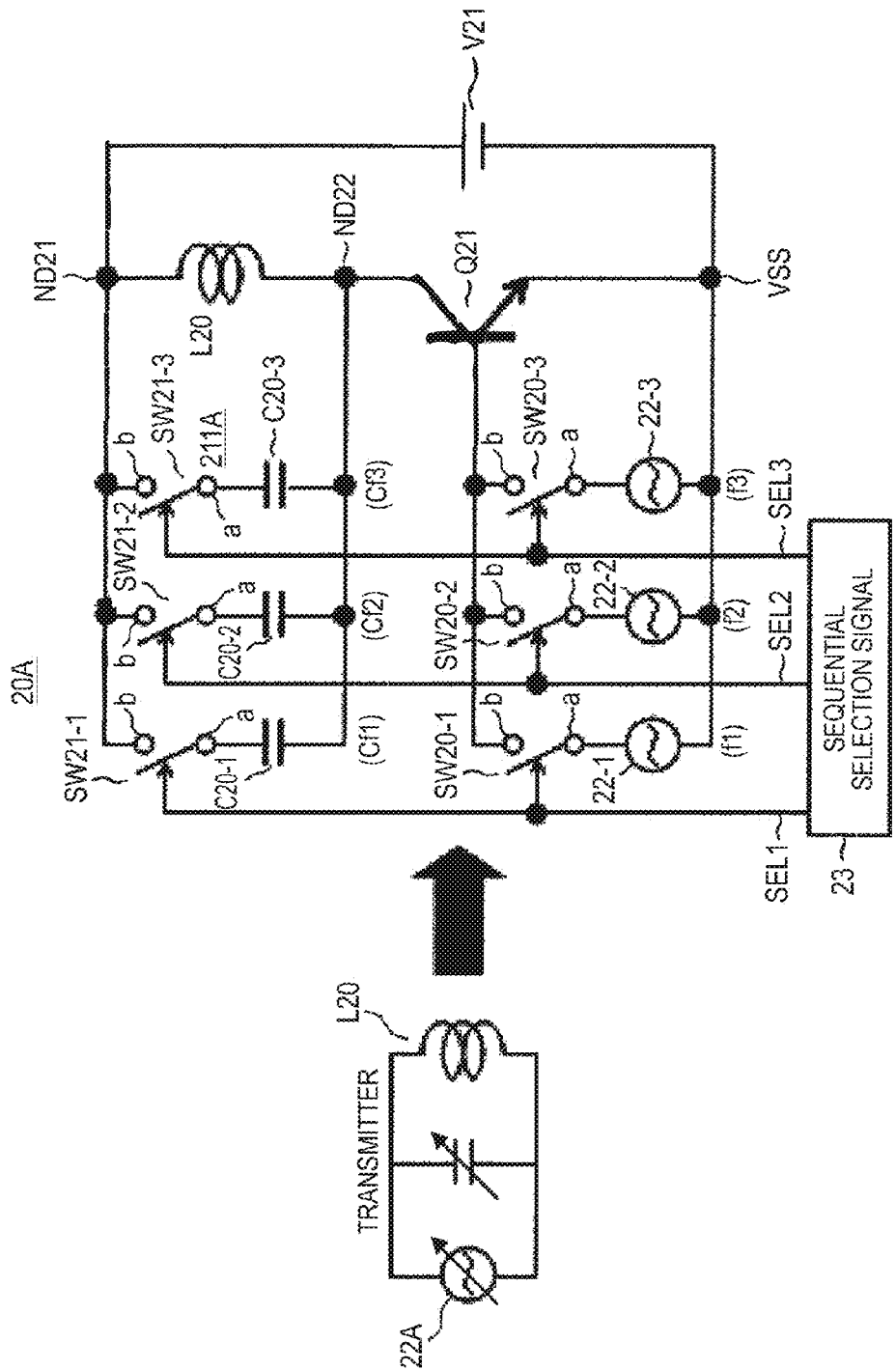
FIG. 10 is a diagram of a specific configuration example for changing the transmission antenna resonant frequency of a transmitter according to the second embodiment.

FIG. 10 is a diagram of a specific configuration example for changing the transmission antenna resonant frequency of the transmitter according to the second embodiment.

The transmitter 20A shown in FIG. 10 is configured to switch high-frequency generating circuits for power transmission 22-1, 22-2, and 22-3 and switch capacitors C20-1, C20-2, and C20-3 of a resonant circuit 211A simultaneously in parallel in synchronization with the switching of the high-frequency generating circuits for power transmission 22-1, 22-2, and 22-3.

The transmitter 20A includes switches SW20-1, SW20-2, and SW20-3 connected to the high-frequency generating circuits 22-1, 22-2, and 22-3.

The transmitter 20A includes switches SW21-1, SW21-2, and SW21-3 respectively connected between one ends of the capacitors C20-1, C20-2, and C20-3 and a node ND21.

The transmitter 20A includes a driving transistor Q21 of an npn type and a power supply V21.

A driving transistor Q21 is connected between a node ND22 of the resonant circuit (a tank circuit) 211A and a reference potential VSS.

Terminals "a" of the switches SW20-1, SW20-2, and SW20-3 are respectively connected to the high-frequency generating circuits 22-1, 22-2, and 22-3 and terminals "b" of the switches SW20-1, SW20-2, and SW20-3 are connected in common to a base of a transistor Q21.

Terminals "a" of the switches SW21-1, SW21-2, and SW21-3 are respectively connected to the other ends of the capacitors C20-1, C20-2, and C20-3 and terminals "b" of the switches SW21-1, SW21-2, and SW21-3 are connected to the node ND21.

When power transmission is performed at the frequency f1, the switches SW20-1 and the SW21-1 are kept in an ON state by a sequential selection signal SEL1 generated by a sequential-selection-signal generating unit 23. The high-frequency generating circuit 22-1 and the capacitor C20-1 are selected.

When power transmission is performed at the frequency f2, the switches SW20-2 and SW21-2 are kept in the ON state by a sequential selection signal SEL2. The high-frequency generating circuit 22-2 and the capacitor C20-2 are selected.

When power transmission is performed at the frequency f3, the switches SW20-3 and SW21-3 are kept in the ON state by a sequential selection signal SEL3. The high-frequency generating circuit 22-2 and the capacitor 20-3 are selected.

In this way, the transmitter 20A is configured such that the frequencies f1, f2, and f3 are sequentially switched by the sequential selection signals SEL1, SEL2, and SEL3 and the resonant frequency of the resonant circuit (the tank circuit) 211A is also switched in synchronization with the switching of the frequencies f1, f2, and f3.

The resonant frequency of the resonant circuit 211A is calculated as, for example, $f1=1/(2\pi\sqrt{L\ Cf1})$.

Figure 11:
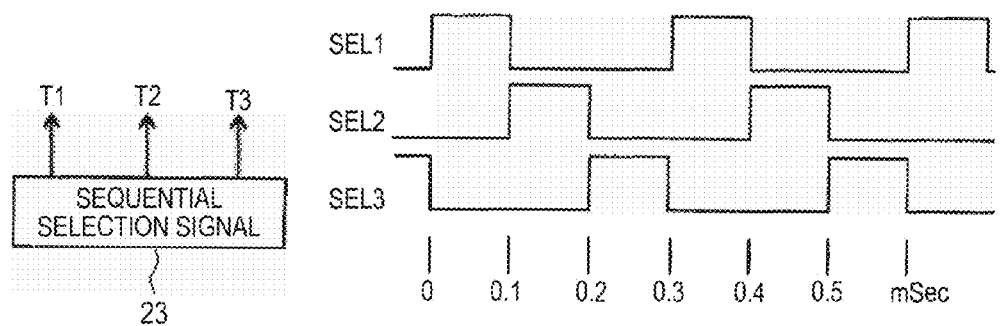
FIG. 11 is a timing chart of a sequential selection signal according to the second embodiment.

FIG. 11 is a timing chart of a sequential selection signal according to the second embodiment.

In FIG. 11, digital signal terminals T1, T2, and T3 respectively correspond to the capacitors C20-1 (Cf1), C20-2 (Cf2), and C20-3 (Cf3) and the high-frequency generating circuits 22-1 (f1), 22-2 (f2), and 22-3 (f3).

As explained above, the switches SW20-1, SW20-2, and SW20-3 and SW21-1, SW21-2, and SW21-3 are turned on in sections in which the sequential selection signals SEL1, SEL2, and SEL3 are at a high level.

In an example shown in FIG. 11, a transmission frequency is automatically switched at every 0.1 ms.

Figure 12:
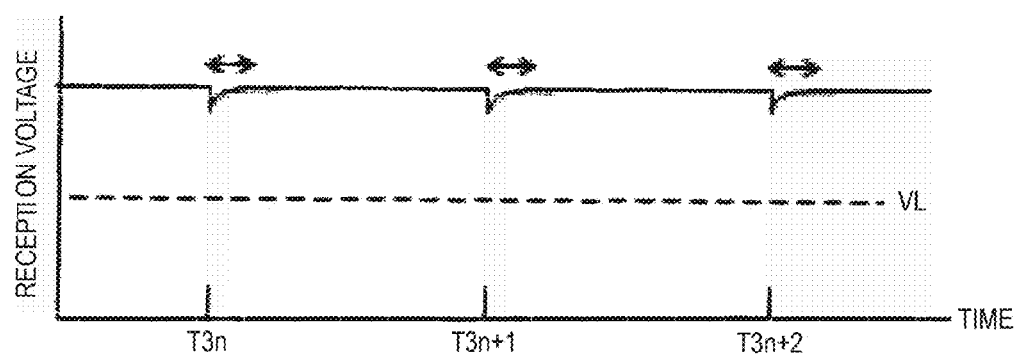
FIG. 12 is a diagram of an example of a reception voltage level of a receiver in the wireless power transmission apparatus according to the second embodiment.

FIG. 12 is a diagram of an example of a reception voltage level of the receiver in the wireless power transmission apparatus according to the second embodiment.

In the wireless power transmission apparatus 10A according to the second embodiment, the reception voltage Vr of the receiver 30A drops for an instant at frequency switching times T3$n$, T3$n$+1, and T3$n$+2 as indicated by arrows in FIG. 12.

However, the reception voltage Vr quickly recovers according to the automatic adjustment function of the reception antenna resonant frequency fr explained in the first embodiment.

If voltage drop tolerance of the receiver is at a level VL indicated by a broken line in FIG. 12, even if the reception voltage Vr drops for an instant, no problem occurs.

Figure 13:
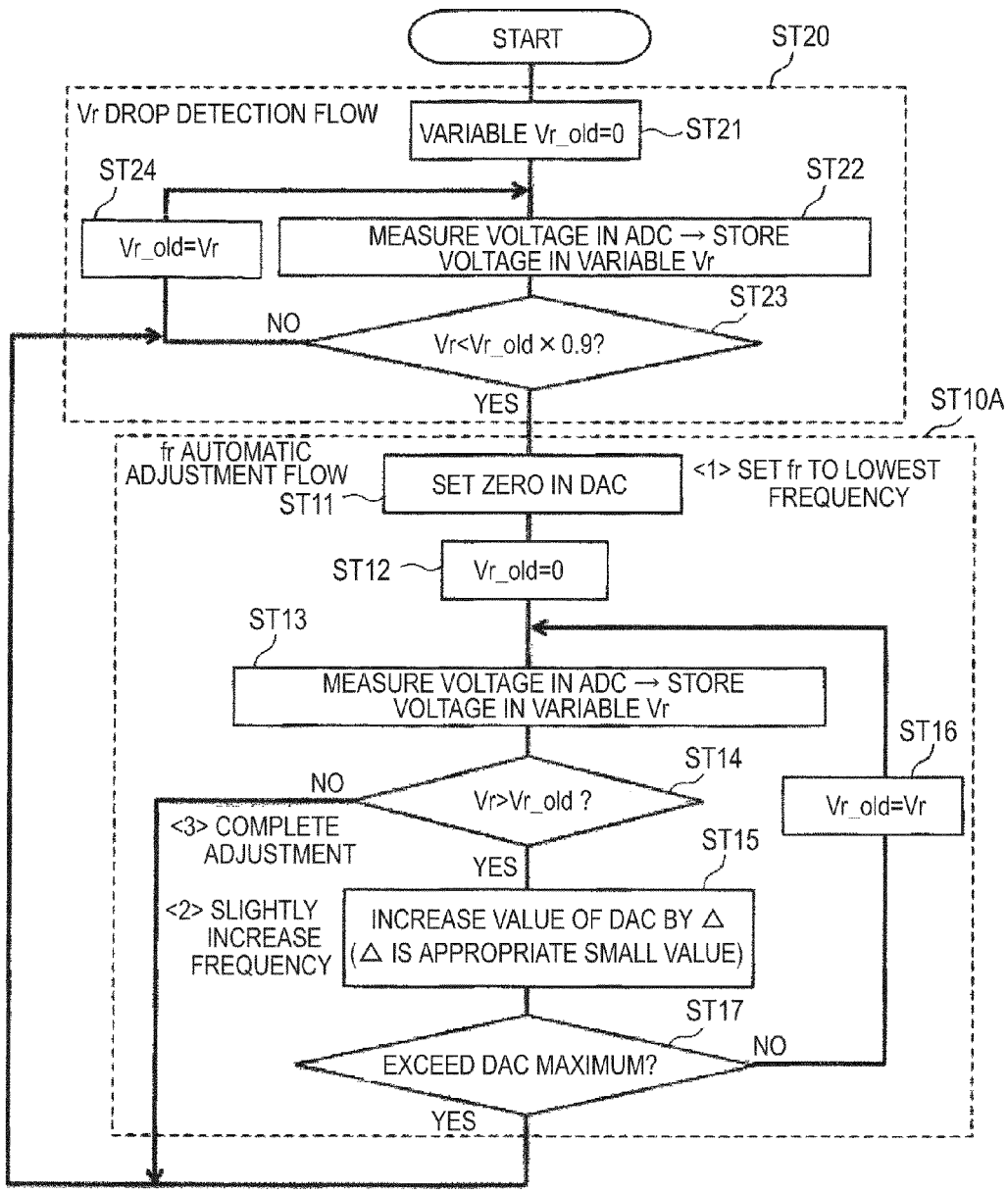
FIG. 13 is a flowchart for explaining control processing by a CPU for controlling a feedback loop of an fr adjusting circuit and automatically adjusting a reception antenna resonant frequency fr according to the second embodiment.

FIG. 13 is a flowchart for explaining control processing by the CPU for controlling a feedback loop of an fr adjusting circuit and automatically adjusting the reception antenna resonant frequency fr according to the second embodiment.

Figure 14:
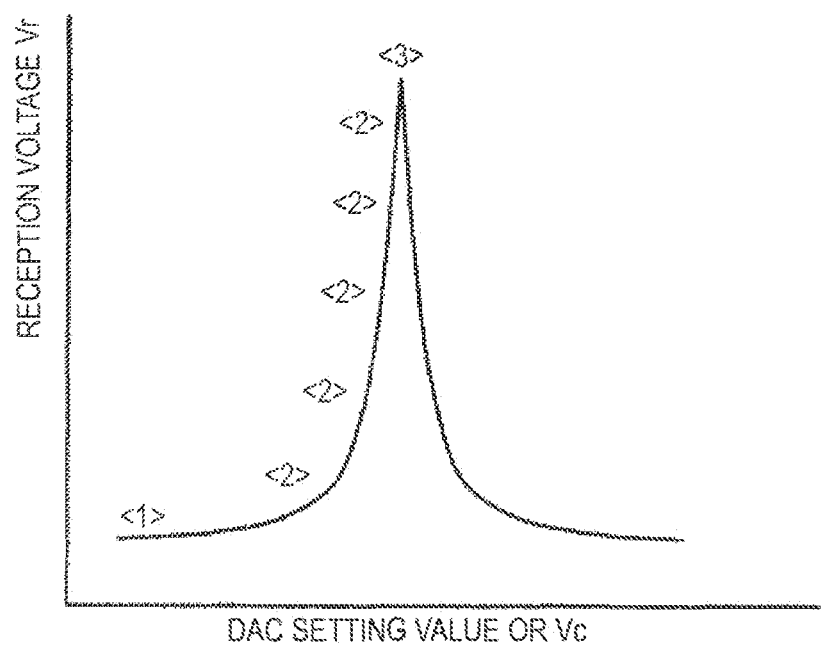
FIG. 14 is a diagram for explaining a relation between a DAC setting value or a variable voltage Vc corresponding to the control processing shown in FIG. 13 and a reception voltage Vr.

FIG. 14 is a diagram for explaining a relation between a DAC setting value or the variable voltage Vc corresponding to the control processing shown in FIG. 13 and the reception voltage Vr.

In the first embodiment, the automatic adjustment is performed only once as shown in the flowchart of FIG. 7. However, in the second embodiment, the reception antenna resonant frequency fr needs to be adjusted many times every time the transmission antenna resonant frequency fo changes.

Therefore, in an fr automatic adjustment flow of the reception antenna resonant frequency fr, a Vr drop detection flow ST20 is added to processing in addition to an fr automatic adjustment flow ST10A.

Processing explained below is performed in the Vr drop detection flow ST20.

[Step ST21]

In step ST21, the CPU 34 sets the variable Vr_old to 0.

[Step ST22]

In step ST22, the CPU 34 detects (measures) a value of the reception voltage Vr from an output of the ADC 331 and stores the value in the variable Vr.

[Steps ST23 and ST24]

In step ST23, the CPU 34 determines whether the value of the variable Vr is smaller than a value of 90% of the variable Vr_old.

When the value of the variable Vr is smaller than the value of 90% of the variable Vr_old, i.e., when the reception voltage Vr decreases, for example, 10%, the CPU 34 shifts to processing in step ST11 of the fr automatic adjustment flow ST10A. The fr automatic adjustment flow automatically starts.

When the value of the variable Vr is not smaller than the value of 90% of the variable Vr_old, in step ST24, the CPU 34 substitutes the value of the variable Vr in the variable Vr_old and returns to the processing in step ST22. The CPU 34 repeats the processing in steps ST22 and ST23.

In the fr automatic adjustment flow ST10A, processing is basically the same as that shown in FIG. 7. However, in step ST15, the CPU 34 determines, after increasing a value of the DAC 332 by Δ, whether the value exceeds a maximum of the DAC 332.

When the value does not exceed the maximum, in step ST16, the CPU 34 substitutes the value of the variable Vr in the variable Vr_old and returns to the processing in step ST13. The CPU 34 repeats the processing in steps ST13 to ST17.

When the CPU 34 determines in step ST14 that the adjustment is completed or when the CPU 34 determines in step ST17 that the value exceeds the maximum of the DAC 332, the CPU 34 shifts to the processing in step ST24 of the Vr drop detection flow ST20.

In this way, in the second embodiment, when the reception voltage Vr decreases, for example, 10%, the CPU 34 controls the fr automatic adjustment flow to automatically start. The fr automatic adjustment flow ST10A is completed, the CPU 34 returns to the Vr drop detection flow ST20.

In this way, the CPU 34 causes the reception antenna resonant frequency fr to follow the transmission frequency sequentially switched in the order of f1, f2, and f3.

A block diagram is basically the same as that in the first embodiment. Only a CPU program has to be changed.

According to the second embodiment, the transmitter 20A changes the transmission antenna resonant frequency fo and the receiver 30A causes the reception antenna resonant frequency fr to follow the transmission antenna resonant frequency fo.

The transmission antenna resonant frequency fo sequentially changes. However, since the reception antenna resonant frequency fr also changes following the transmission antenna resonant frequency fo, transmission efficiency is not deteriorated.

As explained above, even if the apparatus having the resonant frequency f1 is present nearby, since the resonant frequency on the transmission side changes in the order of f1, f2, and f3 every moment, it is possible to suppress influence on the nearby apparatus and the risk of heating or the like is reduced.

<3. Third Embodiment>

Figure 15:
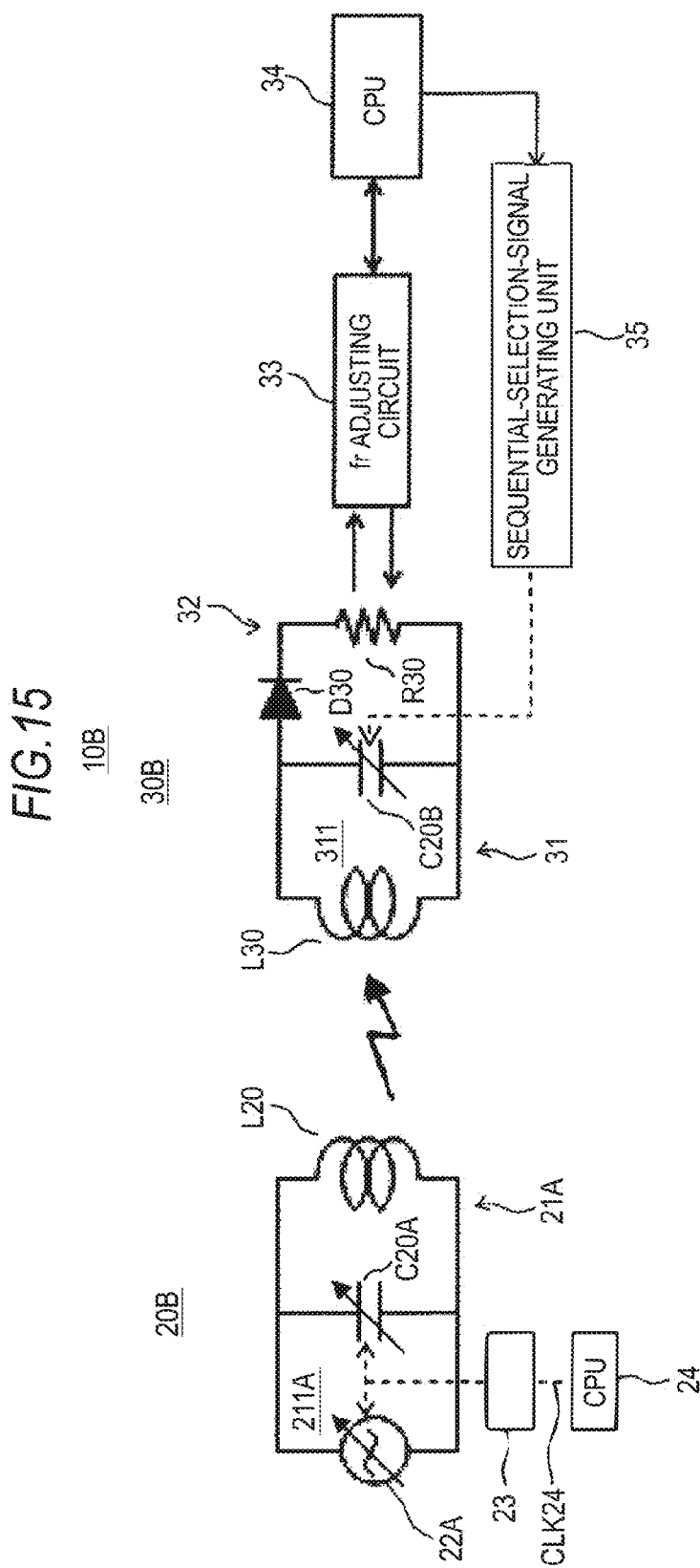
FIG. 15 is a diagram of a basic configuration of a wireless power transmission apparatus according to a third embodiment of the present invention.

FIG. 15 is a diagram of a basic configuration of a wireless power transmission apparatus according to a third embodiment of the present invention.

Figure 16:
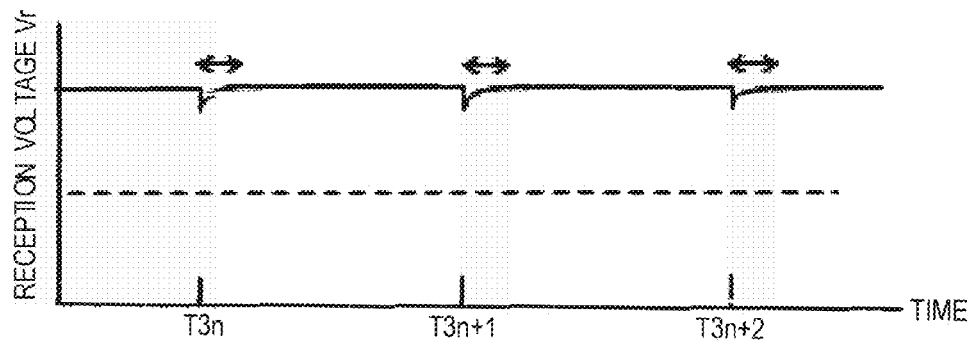
FIG. 16 is a diagram of an example of a reception voltage level of a receiver in the wireless power transmission apparatus according to the third embodiment.

FIG. 16 is a diagram of an example of a reception voltage level of a receiver in the wireless power transmission apparatus according to the third embodiment.

In a wireless power transmission apparatus 10B according to the third embodiment, sequences for changing a resonant frequency according to which a transmitter 20B and a receiver 30B change the resonant frequency are the same.

The wireless power transmission apparatus 10B is configured such that, the receiver 30B recognizes an fo changing sequence of the transmitter 20B and the transmitter 20B and the receiver 30B change the transmission antenna resonant frequency fo in synchronization with each other.

By adopting such a configuration, it is possible to reduce a drop of the reception voltage Vr at frequency switching time as shown in FIG. 16.

Figure 17:
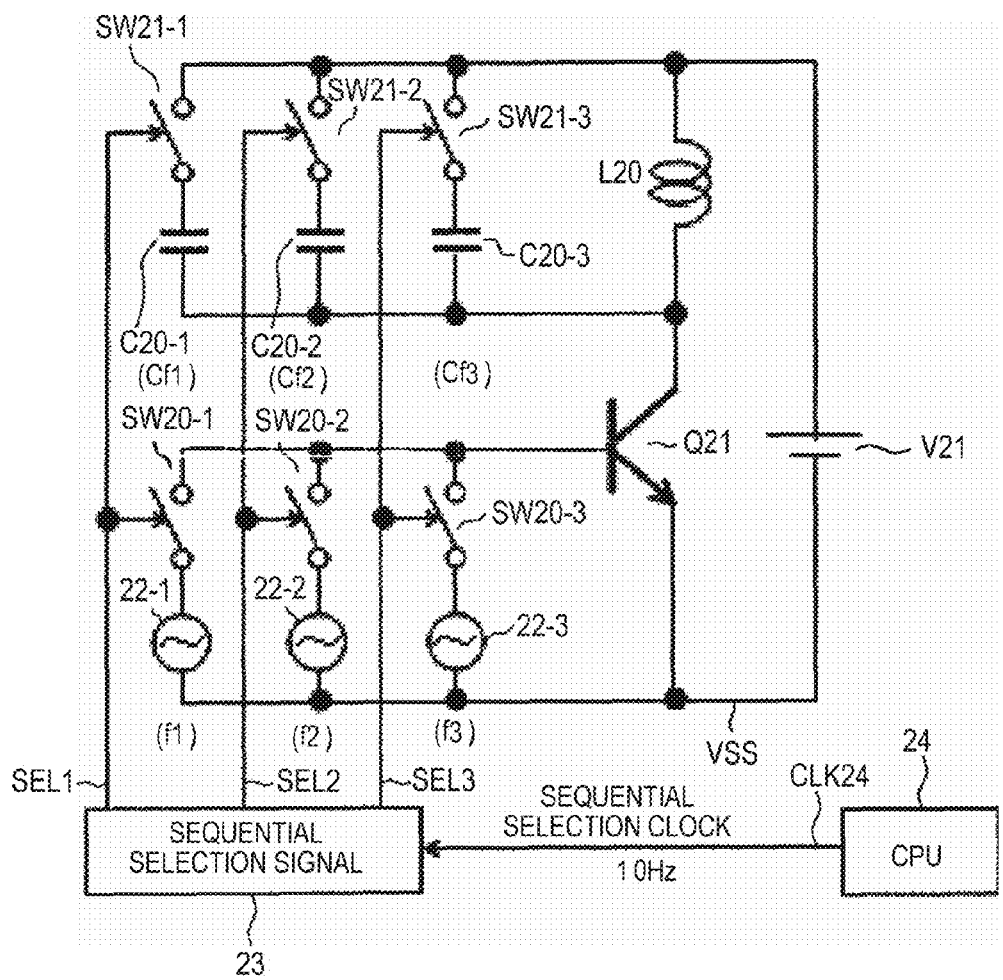
FIG. 17 is a diagram of a specific configuration example for changing the transmission antenna resonant frequency of a transmitter according to the third embodiment.

FIG. 17 is a diagram of a schematic configuration example for changing the transmission antenna resonant frequency of the transmitter according to the third embodiment.

The transmitter 20B according to the third embodiment is different from the transmitter 20A according to the second embodiment as explained below.

The sequential-selection-signal generating circuit 23 of the transmitter 20A according to the second embodiment is a free-running circuit.

On the other hand, in the transmitter 20B according to the third embodiment, a sequential-selection-signal generating unit 23B is driven by a 10 Hz clock signal CLK24 generated by the CPU 34.

Since the frequency of the clock signal CLK24 is 10 Hz, as in the second embodiment, the sequential-selection-signal generating unit 23B generates the sequential selection signals SEL1, SEL2, and SEL3 such that the sequential selection signals SEL1, SEL2, and SEL3 are sequentially selected every 0.1 ms.

Figure 18:
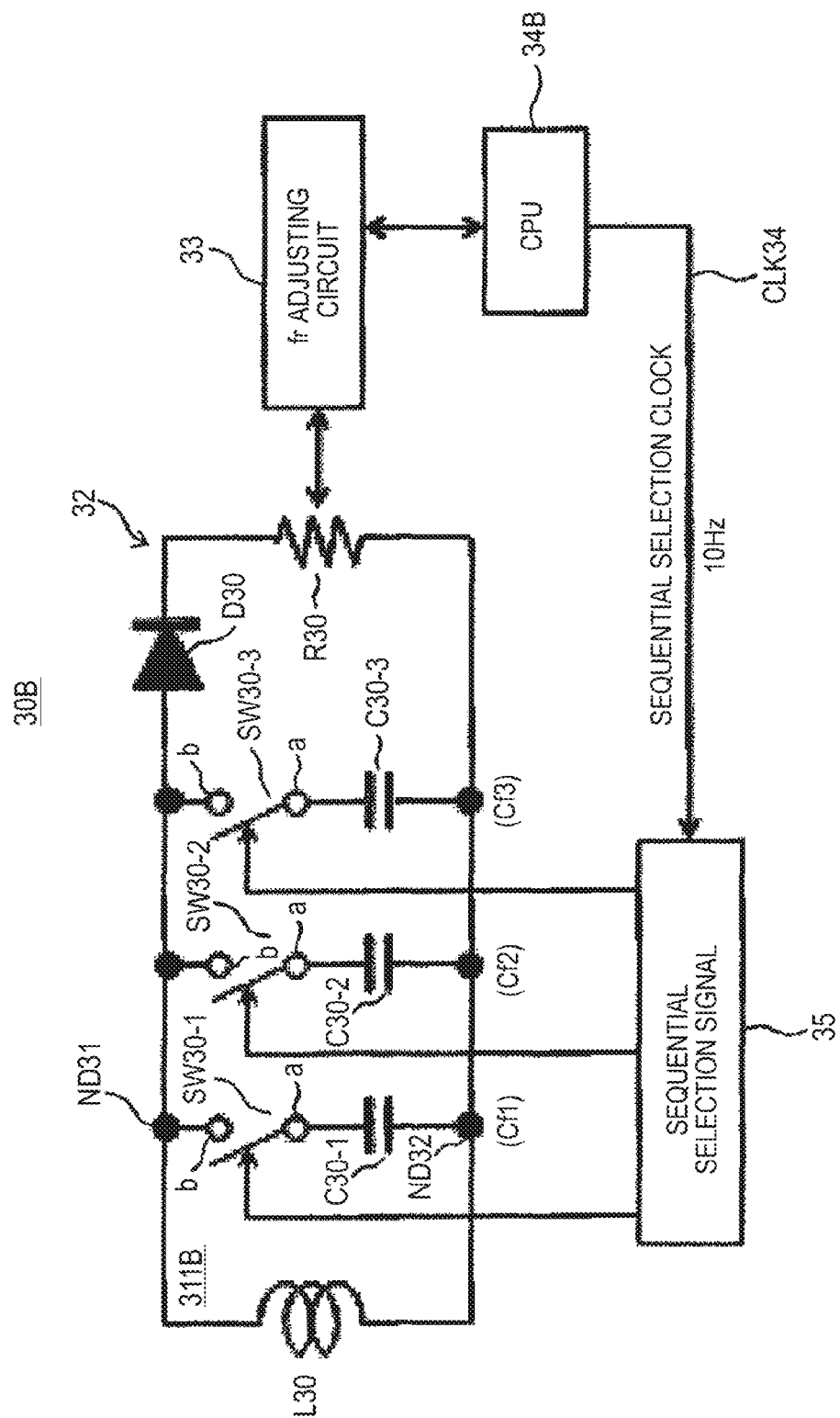
FIG. 18 is a diagram of a configuration example for changing the reception antenna resonant frequency of the receiver according to the third embodiment.

FIG. 18 is a diagram of a configuration example for changing the reception antenna resonant frequency of the receiver according to the third embodiment.

Figure 19:
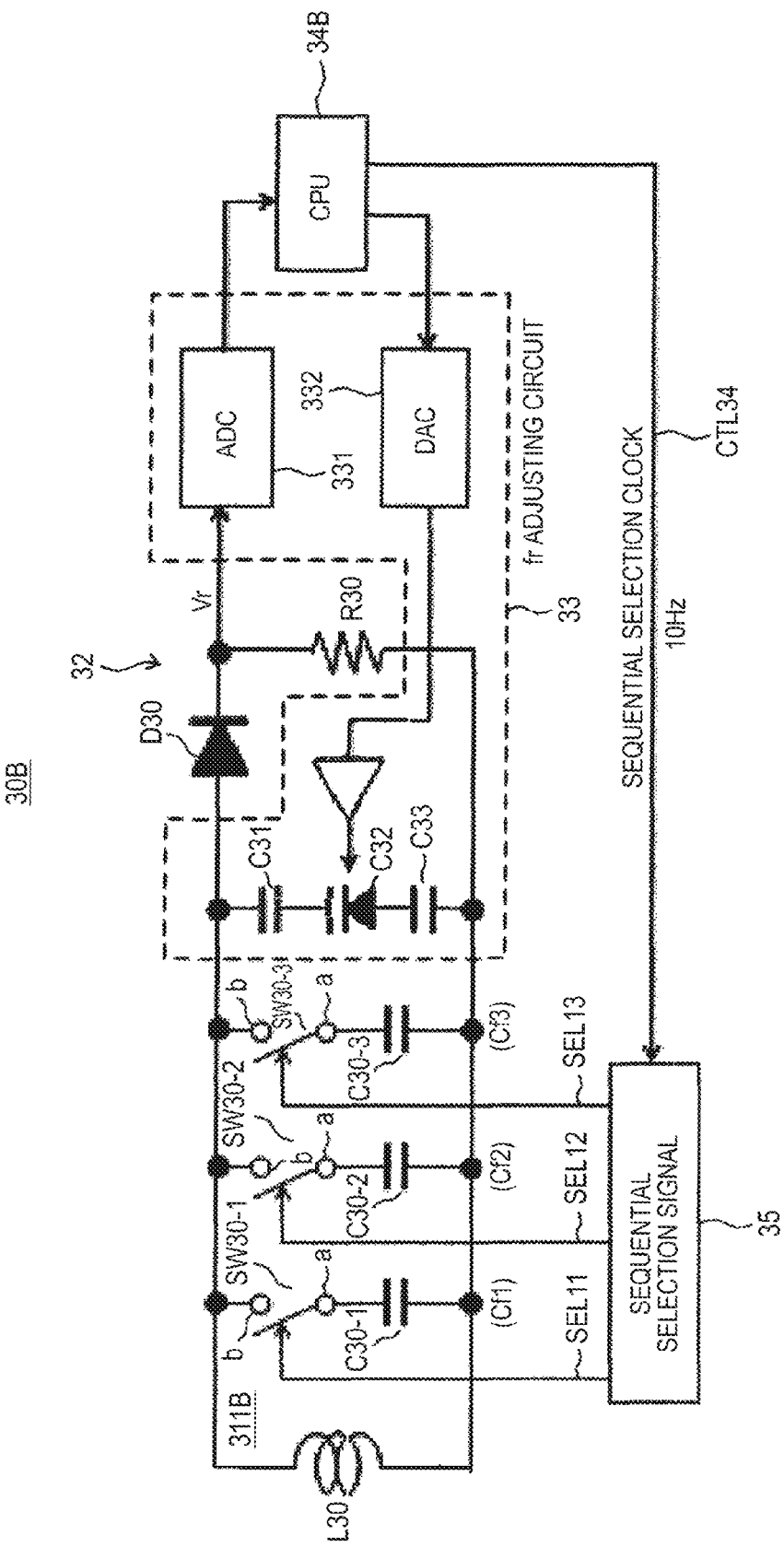
FIG. 19 is a diagram of an fr adjusting circuit of the receiver and a configuration example for changing a reception antenna resonant frequency according to the third embodiment.

FIG. 19 is a diagram of an fr adjusting circuit of the receiver and a configuration example for changing a reception antenna resonant frequency according to the third embodiment.

The receiver 30B shown in FIGS. 17 and 18 are configured to switch three capacitors C30-1, C30-2, and C30-3 in a resonant circuit 311B.

The receiver 30B includes switches SW30-1, SW30-2, and SW30-3 connected between one ends of the capacitors C30-1, C30-2, and C30-3 and the node ND31.

Terminals "a" of the switches SW30-1, SW30-2, and SW30-3 are connected to the other ends of the capacitors C30-1, C30-2, and C30-3 and terminals "b" of the switches SW30-1, SW30-2, and SW30-3 are connected to the nodes ND31.

When power reception is performed at the frequency f1, the switch SW30-1 is kept in the ON state by a sequential selection signal SEL11 generated by a sequential-selection-signal generating unit 35 and the capacitor C30-1 is selected.

When power reception is performed at the frequency f2, the switch SW30-2 is kept in the ON state by a sequential selection signal SEL12 and the capacitor C30-2 is selected.

When power reception is performed at the frequency f3, the switch SW30-3 is kept in the ON state by a sequential selection signal SEL13 and the capacitor C30-3 is selected.

In the third embodiment, rough resonant frequency switching is realized by switching of the capacitors C30-1 (Cf1), C30-2 (Cf2), and C30-3 (Cf3).

Fine resonant frequency switching is realized by the fr adjusting circuit 33 described above.

The sequential-selection-signal generating unit 35 is a circuit having a configuration same as that of the transmitters 20A and 20B.

Figure 20:
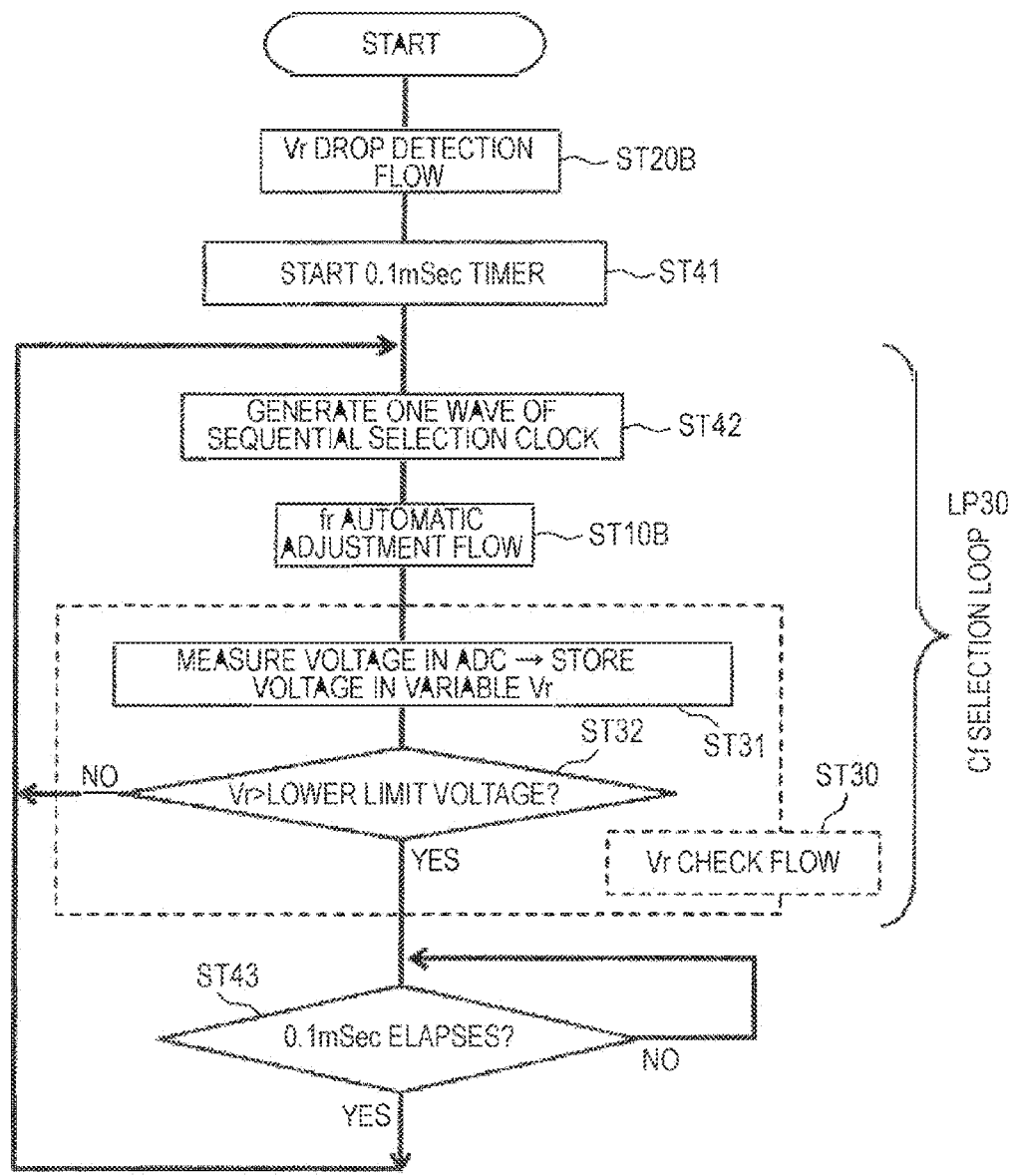
FIG. 20 is a flowchart for explaining control processing by a CPU according to the third embodiment and explaining processing for realizing phase synchronization of a sequential selection signal of the transmitter and a sequential selection signal of the receiver.

FIG. 20 is a flowchart for explaining control processing by a CPU according to the third embodiment and explaining processing for realizing phase synchronization of a sequential selection signal of the transmitter and a sequential selection signal of the receiver.

Figure 21A:
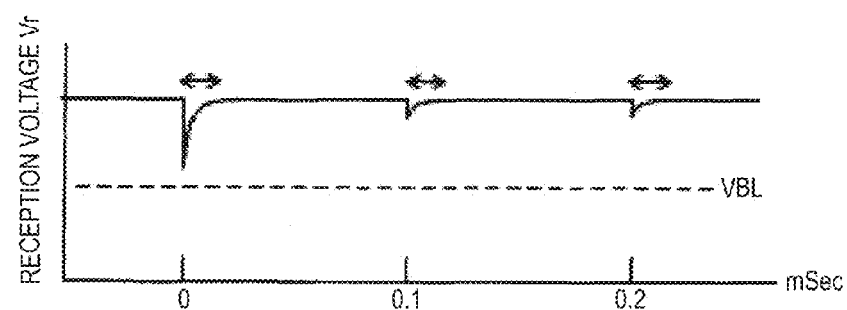
FIGS. 21A to 21C are diagrams of examples of a reception voltage level of the receiver in the wireless power transmission apparatus according to the third embodiment.
Figure 21B:
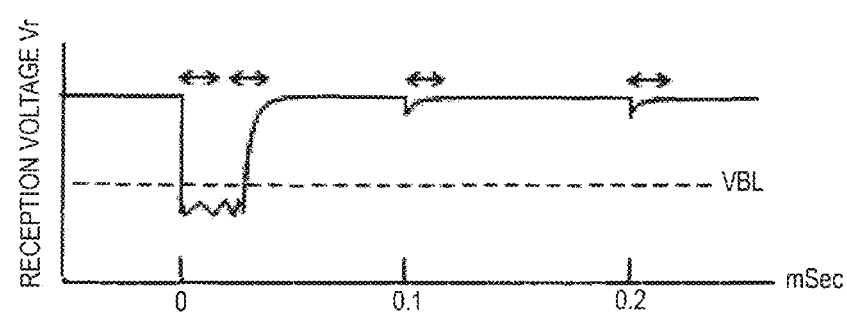
Figure 21C:
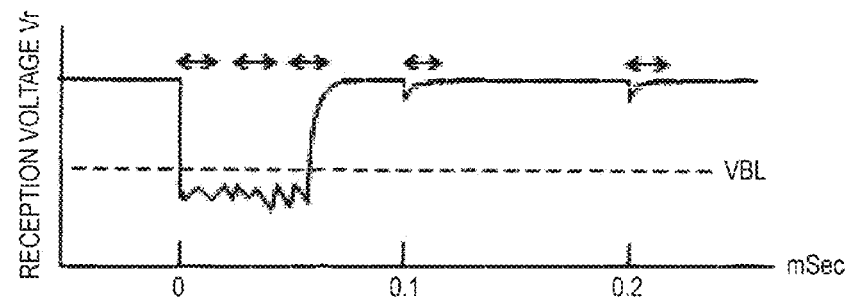

FIGS. 21A to 21C are diagrams of examples of a reception voltage level of the receiver in the wireless power transmission apparatus according to the third embodiment.

In the flowchart of FIG. 20, in a Vr drop detection flow ST20B and an fr automatic adjustment flow ST10B, processing same as that shown in FIG. 13 is basically performed.

In the flowchart of FIG. 20, a Vr check flow ST30 is added.

At time T0, when a drop of the reception voltage Vr is detected in the Vr drop detection flow ST20B, in step ST41, a 0.1 ms timer is started.

The CPU 34B generates one wave of a sequential selection clock (ST42), whereby the capacitors C30-1 (Cf1), C30-2 (Cf2), and C30-3 (Cf3) are switched.

Thereafter, although adjusted in the fr automatic adjustment flow ST10B, since a probability of selection of a correct capacitor Cf is ⅓, the correct capacitor Cf is selected by looping a Cf selection loop LP30 three times at the maximum until the correct capacitor Cf is selected.

In the Vr check flow ST30, in step ST31, the CPU 34B detects (measures) a value of the reception voltage Vr from an output of the ADC 331 and stores the value in the variable Vr.

In step ST32, the CPU 34B compares the reception voltage Vr with a lower limit voltage VBL in order to determine whether the reception voltage Vr is normal.

After time 0.1 ms, the Cf selection loop LP30 is started at every 0.1 ms by the 0.1 ms timer (ST43), a reception frequency is continuously automatically adjusted, and the transmission frequency fo and the reception frequency fr equal to each other are continuously maintained.

FIG. 21A is an example in which, at time T0, the correct capacitor Cf is selected in the first loop.

FIG. 21B is an example in which the correct capacitor Cf is selected in the second loop.

FIG. 21C is an example in which the correct capacitor Cf is selected in the third loop at long last.

Voltage indicated by a wavy line shown in FIGS. 21A to 21C is the lower limit voltage VBL of the Vr check flow.

<4. Fourth Embodiment>

Figure 22:
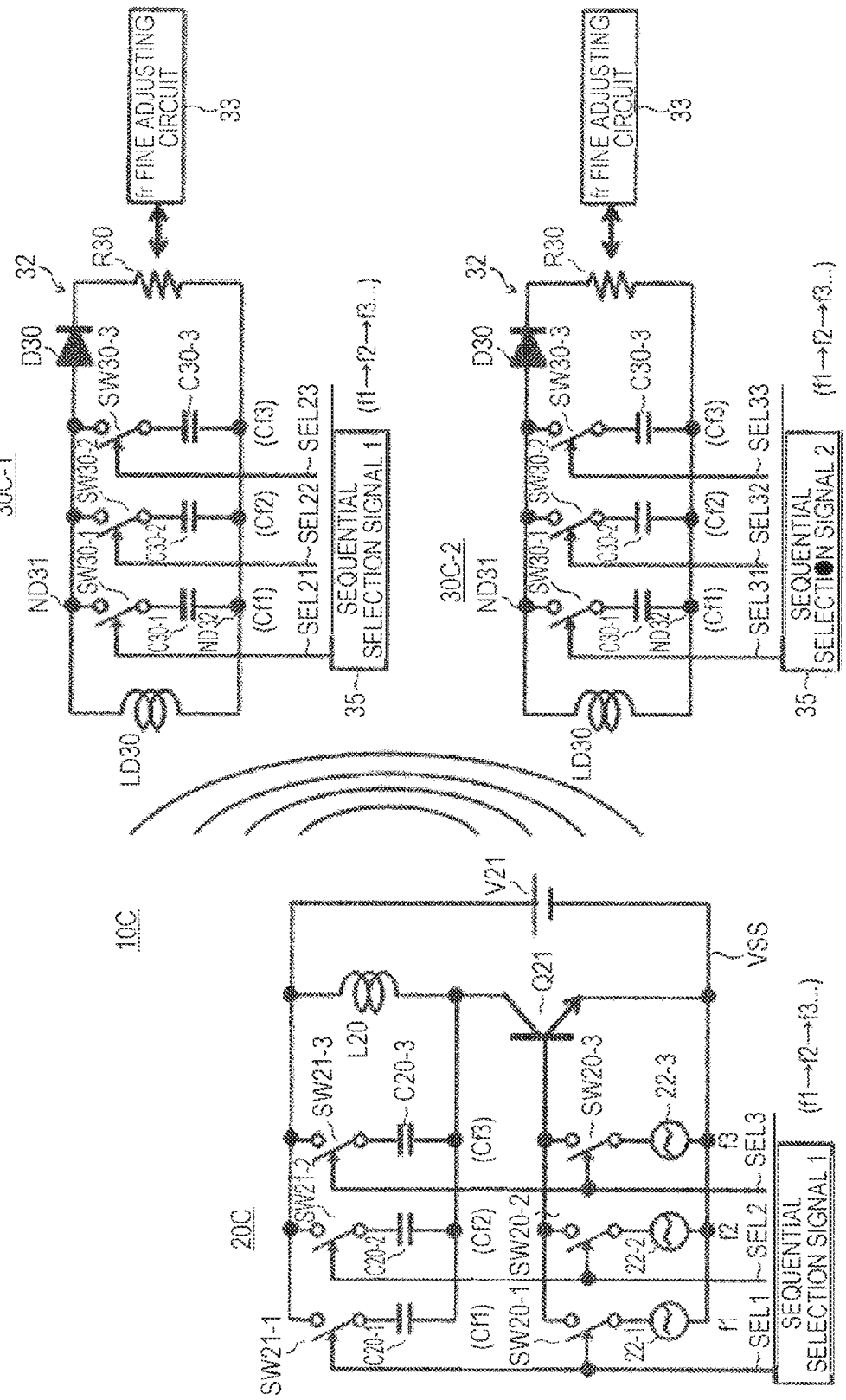
FIG. 22 is a diagram of the configuration of a wireless power transmission apparatus according to a fourth embodiment of the present invention and a configuration example in which plural receivers are present.

FIG. 22 is a diagram of the configuration of a wireless power transmission apparatus according to a fourth embodiment of the present invention and a configuration example in which plural receivers are present.

Figure 23A:
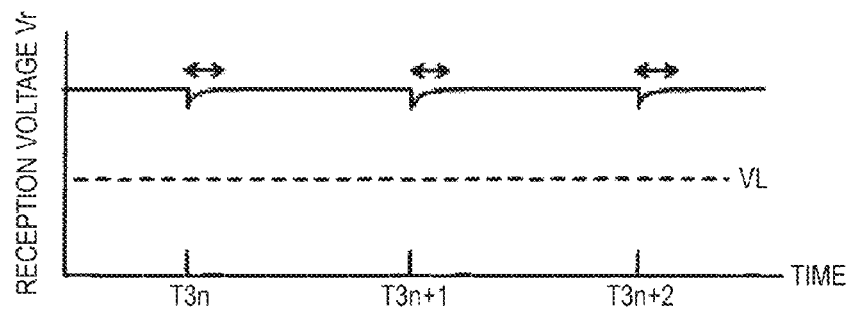
FIGS. 23A and 23B are diagrams of examples of a reception voltage level of a receiver in the wireless power transmission apparatus according to the fourth embodiment.
Figure 23B:
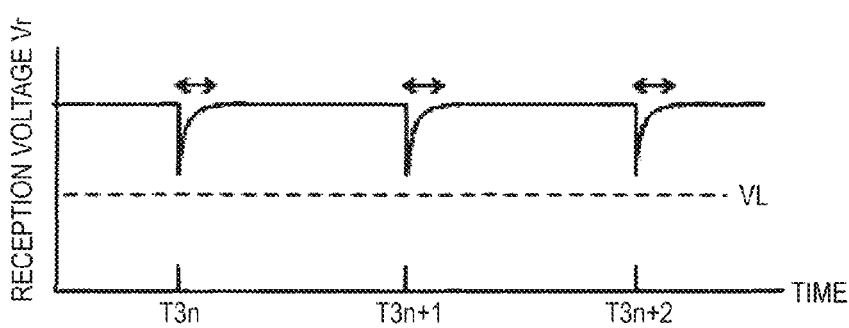

FIGS. 23A and 23B are diagrams of examples of a reception voltage level of a receiver in the wireless power transmission apparatus according to the fourth embodiment. An example of a reception voltage level of a first receiver is shown in FIG. 23A. An example of a reception voltage level of a second receiver is shown in FIG. 23B.

Figure 24A:
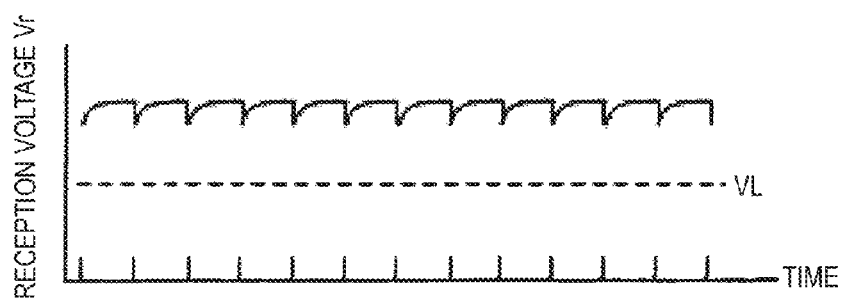
FIGS. 24A and 24B are diagrams of examples of a reception voltage level obtained when a frequency switching period of the receiver in the wireless power transmission apparatus according to the fourth embodiment is reduced.
Figure 24B:
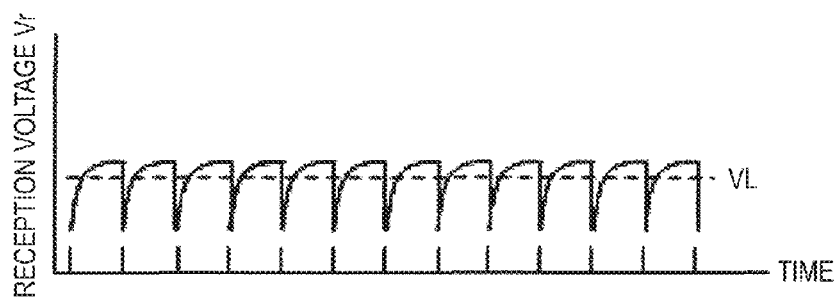

FIGS. 24A and 24B are diagrams of examples of a reception voltage level obtained when a frequency switching period of the receiver in the wireless power transmission apparatus according to the fourth embodiment is reduced. An example of a reception voltage level of the first receiver is shown in FIG. 24A. An example of a reception voltage level of the second receiver is shown in FIG. 24B.

In a wireless power transmission apparatus 10C according to the fourth embodiment, an fo changing sequence on a transmitter 20C side is undisclosed. The wireless power transmission apparatus 10C includes plural receivers, i.e., in this example, a first receiver 30C-1 and a second receiver 30C-2.

Basic configurations of the transmitter 20C, the first receiver 30C-1, and the second receiver 30C-2 are the same as those in the second and third embodiments. Therefore, explanation of the basic configurations is omitted.

In the fourth embodiment, it is assumed that sequential selection signals SEL21, SEL22, and SEL23 of the first receiver 30C-1 change in a pattern (f1→f2→f3→ . . . ) same as the changing pattern of as the sequential selection signals SEL1, SEL2, and SEL3 of the transmitter 20C.

It is assumed that sequential selection signals SEL31, SEL32, and SEL33 of the second receiver 30C-2 change in a pattern (f3→f→f1→ . . . ) different from the changing pattern of the sequential selection signals SEL1, SEL2, and SEL3 of the transmitter 20C.

In other words, in the fourth embodiment, the transmitter 20C generates the sequential selection signals SEL1, SEL2, and SEL3 in this order and selects the frequencies in the order of f1, f2, and f3.

The first receiver 30C-1 generates the sequential selection signals SEL21, SEL22, and SEL23 in this order and selects the frequencies in the order of f1, f2, and f3 according to a changing sequence same as that of the transmitter 20C.

The second receiver 30C-2 generates the sequential selection signals SEL33, SEL32, and SEL31 in this order and selects the frequencies in the order of f3, f2, and f1 according to a changing sequence different from that of the transmitter 20C.

In the wireless power transmission apparatus 10C having such a configuration, a drop at frequency switching time of the reception voltage Vr of the first receiver 30C-1 is small as shown in FIG. 23A.

On the other hand, a drop at frequency switching time of the reception voltage Vr of the second receiver 30C-2 should be large as shown in FIG. 23B.

Therefore, when the variety of a frequency is expanded from f1 to fN and a frequency switching period is reduced, as shown in FIG. 24B, the reception voltage Vr of the second receiver 30C-2 should be deteriorated to performance that does not withstand use.

On the other hand, the reception voltage Vr of the first receiver 30C-1 is not very deteriorated and, as shown in FIG. 24A, can maintain performance that can withstand use.

Therefore, it can be said that, even if the receiver 30C is arranged in a transmission area, the receiver 30C may not be able to satisfactorily receive electric power unless the fo changing sequence of the transmitter is known in advance.

Therefore, if the fo changing sequence of the transmitter 20C is undisclosed, the transmitter 20C can be configured not to feed electric power to a partner to which a user does not desire to transmit electric power.

<5. Fifth Embodiment>

FIG. 25 is a diagram of the configuration of a wireless power transmission apparatus according to a fifth embodiment of the present invention.

A wireless power transmission apparatus 10D according to the fifth embodiment has an authentication sequence for enabling a transmitter 20D and one or plural receivers 30D to share the same fo changing sequence.

In the wireless power transmission apparatus 10D, the receiver 30D has a pair of a public key and a secret key (which are unique).

Specific processing for realizing authentication and safe distribution of the fo changing sequence is explained below.

FIG. 25 is a diagram of an example of a system configuration and an authentication sequence of the wireless power transmission apparatus 10D.

In the sequence shown in FIG. 25, time elapses from up to down in the figure.

In this example, a public key encryption system is used in order to realize safe distribution of the fo changing sequence.

The transmitter 20D includes an encryption circuit 25 and an authentication routine 26.

The receiver 30D includes a key generating circuit 36 and a decryption circuit 37.

The sequence is explained below.

A user 40, the transmitter 20D, an authentication transmission line 50, and the receiver 30D appear in this explanation of the sequence.

The authentication transmission line 50 may be a wireless power transmission line or may be an infrared communication line. Various forms of the authentication transmission line 50 are possible.

The user 40 turns on a power supply for the receiver 30D (SQ1). Consequently, the authentication sequence begins.

The receiver 30D transmits an authentication request and a password to the transmitter 20D via the authentication transmission line 50 (SQ2).

The transmitter 20D checks the password and returns authentication OK to the receiver 30D via the authentication transmission line 50 (SQ3).

The receiver 30D issues a key generation request to the key generating circuit 36 placed in the receiver 30D (SQ4). The key generating circuit 36 generates a public key and a secret key.

The receiver 30D transmits the public key to the transmitter 20D via the authentication transmission line 50 (SQ5).

The transmitter 20D creates an fo changing sequence encrypted by the public key in the encryption circuit 25 and returns the fo changing sequence to the receiver 30D via the authentication transmission line 50 (SQ6).

The receiver 30D decrypts a changing sequence encrypted by the secret key generated in the sequence SQ4 and obtains the fo changing sequence (SQ7).

The transmitter 20D starts power transmission (SQ8). The transmitter 20D and the receiver 30D change the transmission resonant frequency fo according to the fo changing sequence. Normal power transmission starts.

Distribution of the fo changing sequence is performed between the transmitter 20D and the receiver 30D. However, since the fo changing sequence is encrypted by using the public key, safe distribution can be realized.

The authentication and the fo changing sequence distribution (hereinafter simply referred to as authentication) can be performed in the wireless power transmission line.

This is nothing but modulating a signal and performing two-way information transmission via the wireless power transmission line. Therefore, four sixth to ninth embodiments are explained below as examples.

Sixth Embodiment: A transmitter having a modulating function

Seventh Embodiment: A decoding circuit of a receiver

Eighth Embodiment: A circuit of the receiver that performs information transmission to the transmitter Ninth Embodiment: A circuit of the transmitter that decodes data from the receiver <6. Sixth Embodiment>

FIG. 26 is a diagram of an example of a transmitter having a modulating function according to a sixth embodiment of the present invention.

A transmitter 20E according to the sixth embodiment is different from the transmitter 20B according to the third embodiment in that a switch for modulation SW22 is arranged between the base of the transistor Q21 and the terminals "b" of the switches SW20-1, SW20-2, and SW20-3.

In the transmitter 20E, a CPU 24E turns on and off the switch SW22 according to transmission data SD and applies burst-like modulation to a transmission signal SG.

At this point, in order to prevent malfunction of a receiver, it is advisable to stop a sequential selection signal without moving the sequential selection signal.

<7. Seventh Embodiment>

Figure 27:
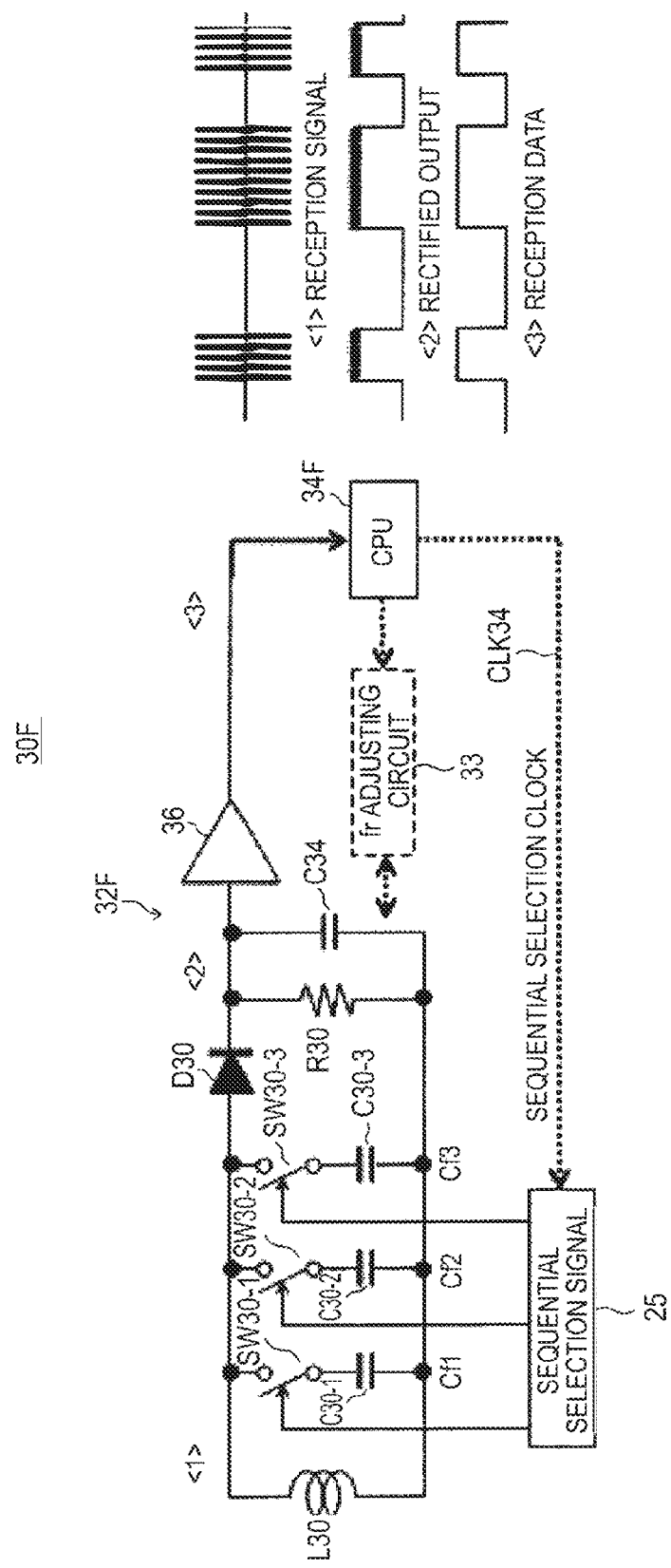
FIG. 27 is a diagram of an example of a decoding circuit of a receiver according to a seventh embodiment of the present invention.

FIG. 27 is a diagram of an example of a decoding circuit of a receiver according to a seventh embodiment of the present invention.

A receiver 30F according to the seventh embodiment is different from the receiver 30B according to the third embodiment in that a capacitor C34 having a discharge time constant suitable for decoding is connected in parallel to the load resistance element R30 and a waveform shaping amplifier 38 is arranged at the output of a rectifying unit 32F of the receiver 30F.

Since the receiver 30F is a type of a rectifying circuit, it can be said that the receiver 30F is exactly an AM demodulating circuit.

Therefore, if the capacitor C34 having the discharge time constant suitable for decoding and the waveform shaping amplifier 38 are added, it is possible to decode reception data.

In order to prevent an fr adjustment flow from reacting to amplitude fluctuation, the fr adjusting circuit 33, a sequential selection clock, and an fr adjustment flow of a CPU 34F are desirably set off.

<8. Eighth Embodiment>

Figure 28:
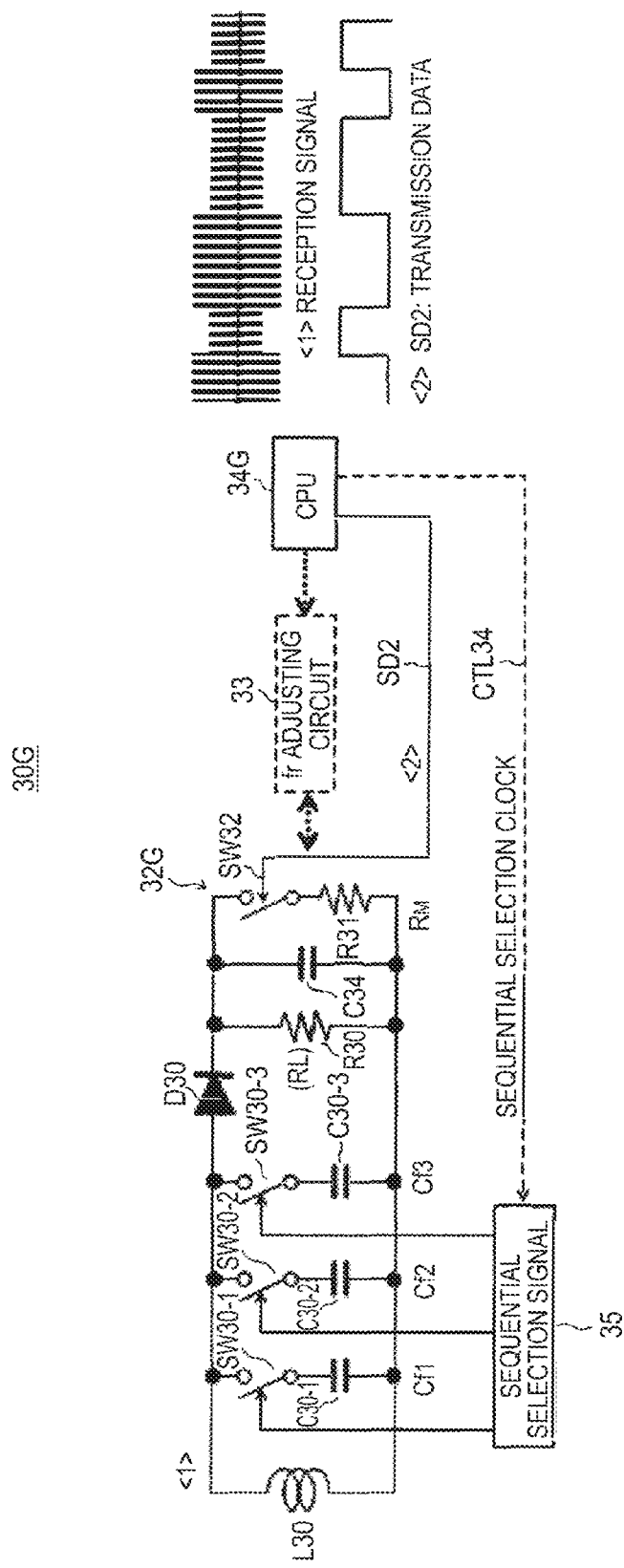
FIG. 28 is a diagram of an example of a circuit of a receiver for transmitting information to a transmitter according to an eighth embodiment of the present invention.

FIG. 28 is a diagram of an example of a circuit of a receiver for transmitting information to a transmitter according to an eighth embodiment of the present invention.

A receiver 30G according to the eighth embodiment is different from the receiver 30B according to the third embodiment in that the capacitor C34 and a load resistance element R31 and a switch SW32 connected in series are connected in parallel to the load resistance element R30.

The resistance of the load resistance element R30 is RL and the resistance of the load resistance element R31 is RM.

This information transmission circuit operates under the same principle as a general non-contact IC or the like.

When transmission data SD2 is "0", the switch SW32 is off. Therefore, a load is the resistance RL of the load resistance element R30.

When the transmission data SD2 is "1", the load is {RL*RM/(RL+RM)}. Therefore, the load increases and a voltage drop of the reception signal Vr increases. Therefor, it is possible to apply AM modulation to the reception signal Vr.

In order to prevent an fr adjustment flow from reacting to amplitude fluctuation, the fr adjusting circuit 33, a sequential selection clock, and an fr adjustment flow of a CPU 34G are desirably set off.

<9. Ninth Embodiment>

Figure 29:
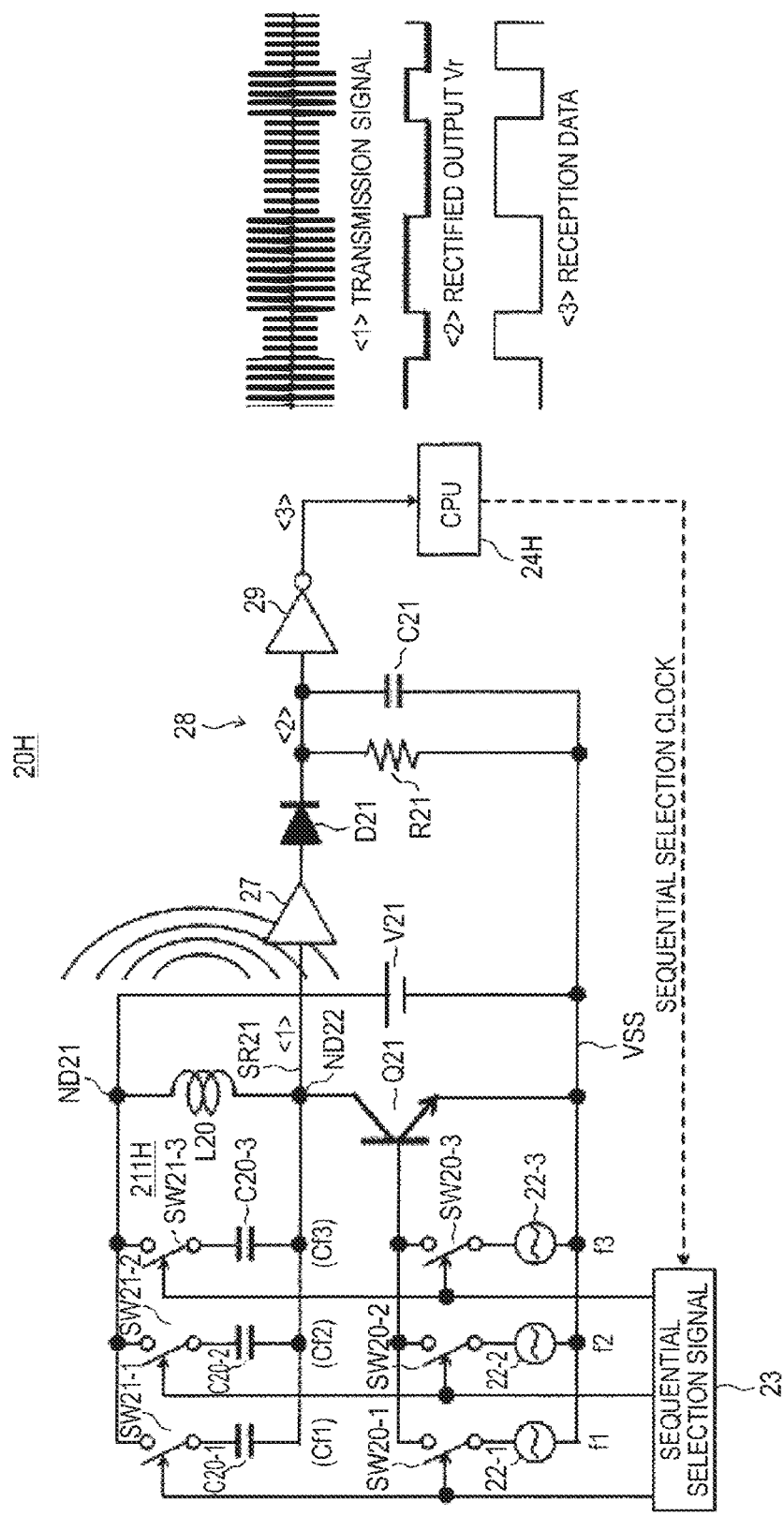
FIG. 29 is a diagram of an example of a circuit of a transmitter for decoding information from a receiver according to a ninth embodiment of the present invention.

FIG. 29 is a diagram of an example of a circuit of a transmitter for decoding information from a receiver according to a ninth embodiment of the present invention.

A transmitter 20H according to the ninth embodiment is different from the transmitter 20B according to the third embodiment in that a buffer amplifier 27, a rectifying unit 28, and an inverter 29 for waveform shaping are arranged in an other end side node ND22 of an inductor L2 of a resonant circuit 211H.

An output of the inverter 29 is input to a CPU 24H.

The rectifying unit 28 includes a diode D21, a load resistance element R21, and a capacitor C21.

A signal SR21 received by the transmitter 20H is AM-modulated by the receiver.

The reception signal SR21 emerges at the node ND22, AM-decoded by the rectifying unit 28 including the diode D21, the load resistance element R21, and the capacitor C21 via the buffer amplifier 27, and waveform-shaped by the inverter 29 to obtain reception data.

In order to prevent malfunction, it is advisable to stop a sequential selection signal without moving the sequential selection signal.

[Transmission Line for Authentication]

It is also possible to perform the authentication using a transmission line separate from the power transmission line, for example, an infrared communication line.

In this case, the power transmission line may be utilized as only the power transmission line and the separate transmission line such as the infrared communication line may be used as a data transmission line for authentication.

<10. Tenth Embodiment>

In a tenth embodiment, a configuration and a function for eliminating a deficiency in that a power supply is not turned on and even authentication may not be able to be performed because a receiver before authentication may not be able to sufficiently receive electric power are explained.

In this case, for example, a characteristic configuration explained below is adopted.
1) A changing sequence is an fo changing sequence in which one or plural specific frequencies fa are periodically selected.
2) The frequency fa is used as a channel used for authentication.
3) The transmission power of the frequency fa is smaller than the transmission power of frequencies other than fa.
4) In a period until authentication completion, a receiver is in a low-power mode.
5) When the resonant frequency is the frequency fa, a transmitter polls an authentication request of the receiver.
6) Even after the authentication, the transmitter and the receiver periodically perform authentication.

Figure 30:
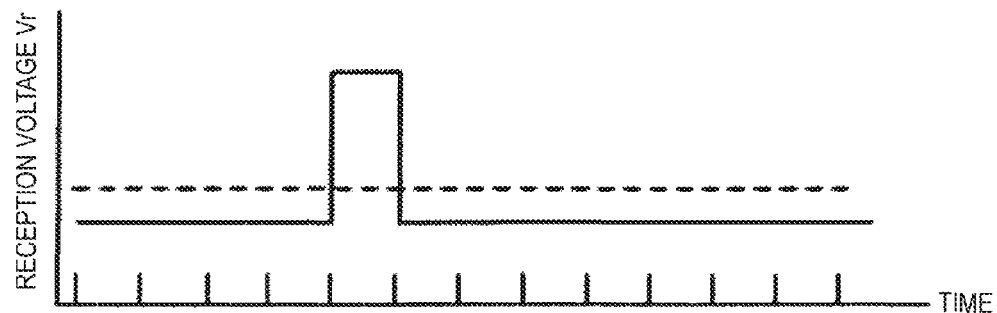
FIG. 30 is a diagram of an example of a reception voltage on a receiver side obtained when an fo sequence of a transmitter is switched and a resonant frequency changes to fa according to a tenth embodiment of the present invention.

FIG. 30 is a diagram of an example of a reception voltage on a receiver side obtained when an fo sequence of a transmitter is switched and a resonant frequency changes to fa according to the tenth embodiment of the present invention.

Figure 31:
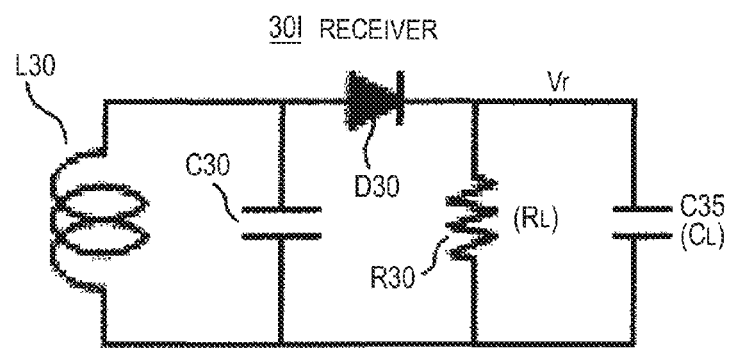
FIG. 31 is a diagram of an equivalent circuit of a general receiver in which a smoothing capacitor is added in parallel to a load resistance element.

FIG. 31 is a diagram of an equivalent circuit of a general receiver in which a smoothing capacitor is added in parallel to a load resistance element.

Figure 32:
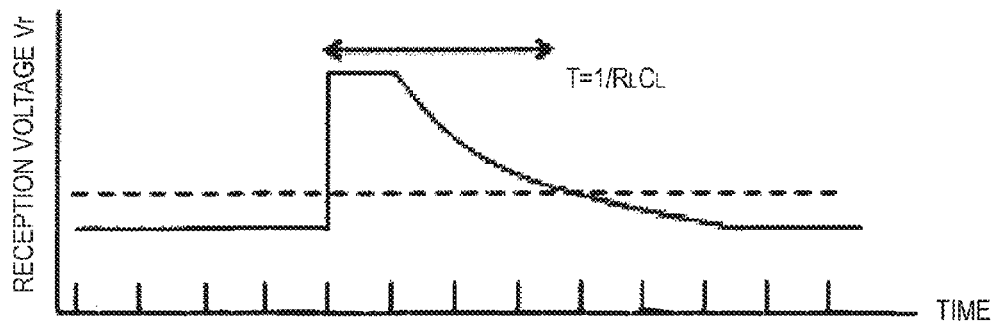
FIG. 32 is a diagram of a state of a drop of a reception voltage by the smoothing capacitor.

FIG. 32 is a diagram of a state of a drop of a reception voltage by the smoothing capacitor.

In the tenth embodiment, it is assumed that a receiver 30I before authentication is on standby for power reception at the resonant frequency fa.

On the other hand, the fo sequence of the transmitter 20 is sequentially switched and, at an instance when a transmission frequency changes to fa, the receiver 30I becomes capable of normally receiving electric power and the reception voltage Vr increases as shown in FIG. 30.

In most cases, as shown in FIG. 31, a smoothing capacitor C35 (capacitance CL) is added in parallel to the load resistance R30 (the resistance RL) of the receiver 30I.

As shown in FIG. 32, dropping speed of the reception voltage Vr decreases at a time constant of T=1/(RL CL) according to an action of the smoothing capacitor C35.

Therefore, if it is guaranteed that a transmission frequency occasionally changes to fa, there is room in that an authentication operation only has to be completed during time until the smoothing capacitor C35 finishes discharging.

If a low-power mode only for authentication is provided in the receiver 30I besides a normal mode, T can be further extended.

Figure 33:
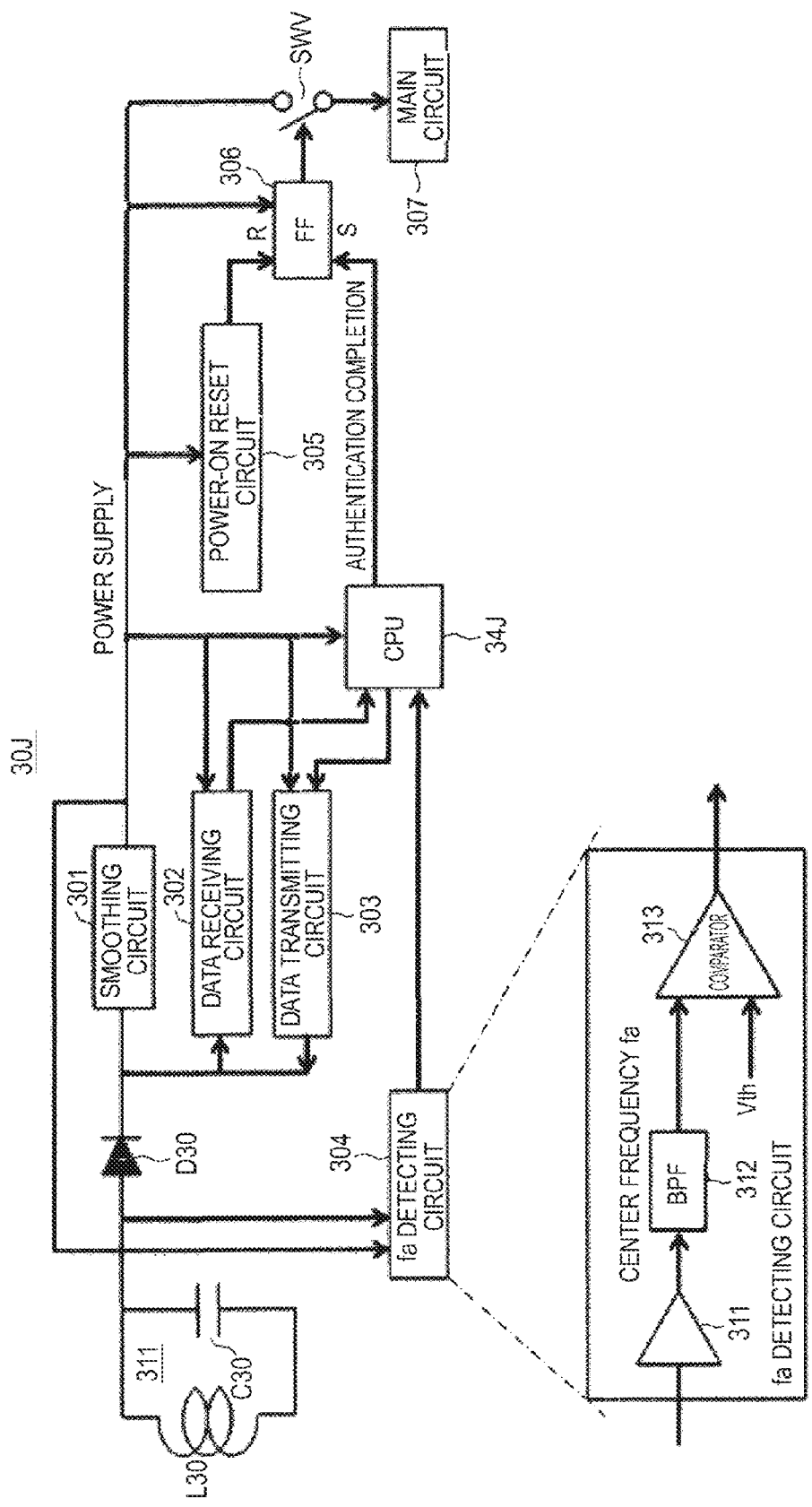
FIG. 33 is a diagram of a configuration example corresponding to a low-power mode for authentication in the receiver according to the tenth embodiment.

FIG. 33 is a diagram of a configuration example corresponding to a low power mode for authentication in the receiver according to the tenth embodiment.

A receiver 30J shown in FIG. 33 includes a smoothing circuit 301, a data receiving circuit 302, and a data transmitting circuit 303 besides the resonant circuit 311, the diode D30, and a CPU 34J.

The receiver 30J includes an fa detecting circuit 304, a power-on reset circuit 305, a flip-flop (FF) 306, a main circuit 307, and a main power switch SWV.

The fa detecting circuit 304 includes a buffer 311, a band-pass filter (BPF) 312, and a comparator 313 that compares the BPF 312 and a threshold Vth and outputs a comparison result to the CPU 34J.

In the receiver 30J shown in FIG. 33, the flip-flop (FF) 306 is reset by the power-on reset circuit 305 and the main power switch SWV is automatically turned off.

When the authentication is completed and the CPU 34J outputs an authentication completion signal, the FF 306 is set and the main power switch SWV is turned on.

In this way, when the receiver 30J has low power during the authentication, a transmitter 20J may perform low-power transmission.

Figure 34:
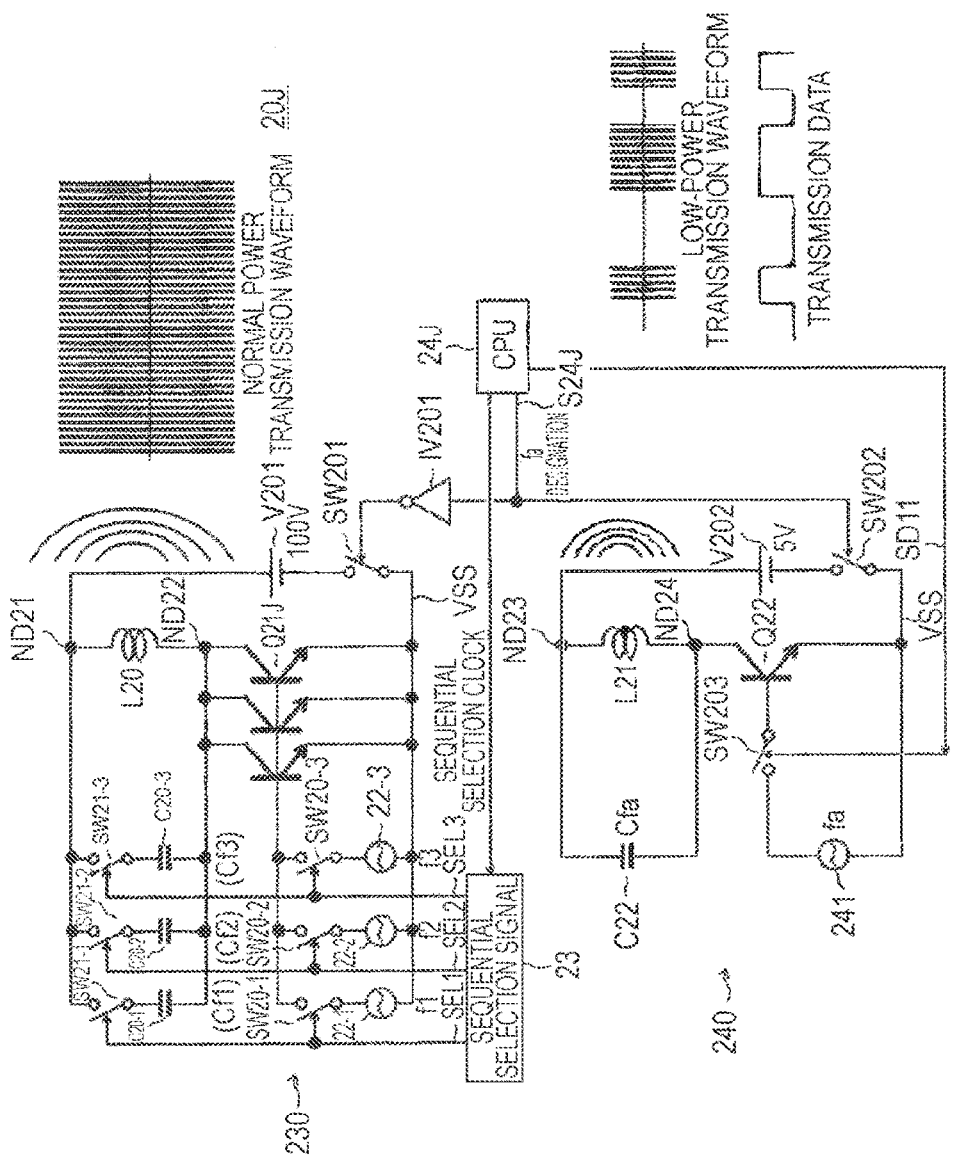
FIG. 34 is a diagram of a configuration example corresponding to a low-power mode for authentication in the transmitter according to the tenth embodiment.

FIG. 34 is a diagram of a configuration example corresponding to the low-power mode for authentication in the transmitter according to the tenth embodiment.

The transmitter 20J shown in FIG. 34 includes a normal transmission circuit unit 230 and a low-power transmission circuit unit 240.

The normal transmission circuit unit 230 has a circuit configuration substantially the same as that of the transmitter 20B shown in FIG. 17 but is different as explained below.

The normal transmission circuit unit 230 includes a 100V power supply V201 and a switch SW201 connected to a negative pole side of the power supply V201 and the reference potential VSS.

In the normal transmission circuit unit 230, a triple high-power type is adopted as a driving transistor Q21J.

The low-power transmission circuit unit 240 includes a 5V power supply V202 and a switch SW202 connected between a negative pole side of the power supply V202 and the reference potential VSS.

The low-power transmission circuit unit 240 includes an inductor L21 and a capacitor C22 connected in parallel that form a resonant circuit (a tank circuit). A node ND23 to which one end of the inductor L21 is connected is connected to a positive side of the power supply V202. The other end of the inductor L21 is connected to a node ND24.

The low-power transmission circuit unit 240 includes a driving transistor Q22, a switch SW203, and a signal generating unit 241 that generates a signal having the frequency fa.

A collector of the driving transistor Q22 is connected to the node ND24, an emitter of the driving transistor Q22 is connected to the reference potential VSS, and a base of the driving transistor Q22 is connected to the signal generating unit 241 via the switch SW203.

The switch SW202 is turned on and off by an fa designation signal S24J of a CPU 24J. The switch SW201 of the normal transmission circuit unit 230 is turned on and off by an fa designation signal inverted by an inverter IV201.

In other words, the switch SW202 and the switch SW201 are complementarily turned on and off.

The switch SW203 is turned on and off by transmission data SD11 generated by the CPU 24J.

In FIG. 34, during normal power transmission, the triple high-power type is adopted as the driving transistor Q21J at a circuit voltage of 100V.

During low-power transmission for authentication at the frequency fa, a small-signal transistor Q22 is adopted at a circuit voltage of 5V.

When a signal having the frequency fa should be transmitted, the CPU 24J sets the fa designation signal S24J to a high level.

Figure 35:
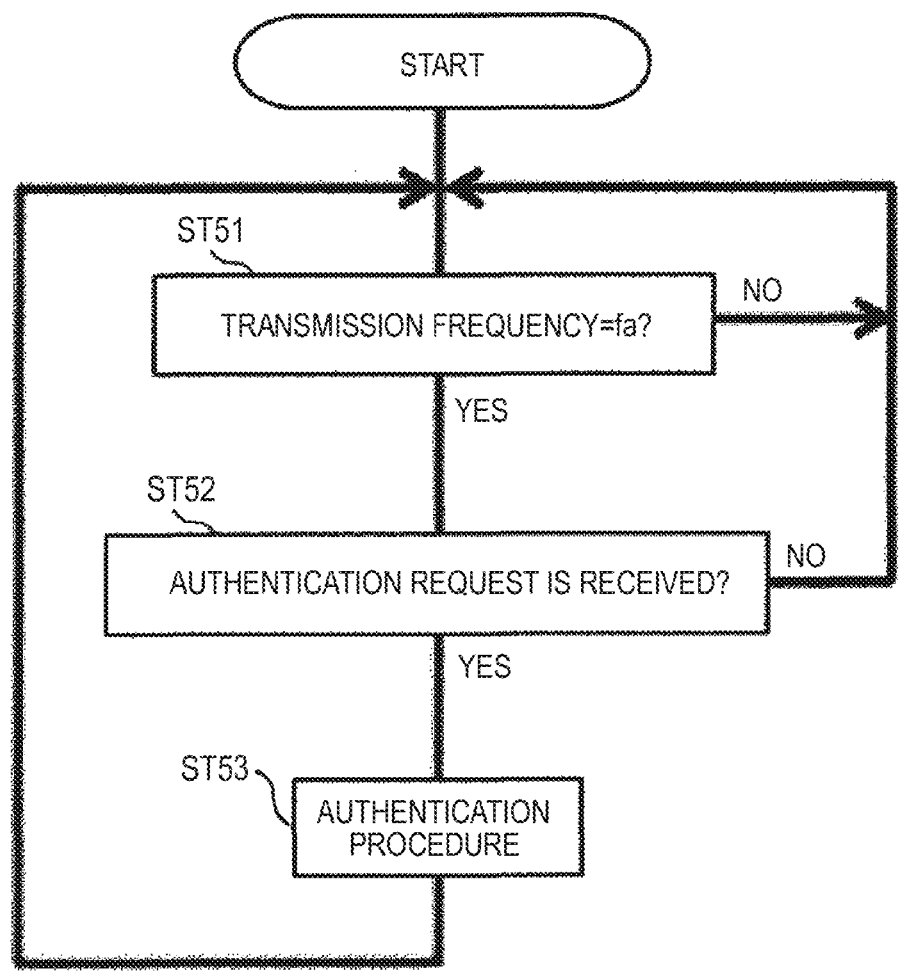
FIG. 35 is a flowchart for explaining authentication adaption of a circuit shown in FIG. 34.

FIG. 35 is a flowchart for explaining authentication adaption of the circuit shown in FIG. 34.

When a transmission frequency is fa, it is likely that the receiver 30J is transmitting an authentication request. Therefore, the transmitter 20J needs to poll the authentication request from the receiver 30J when the transmission frequency is fa (ST51 to ST53).

An authentication procedure is performed in the same manner as the procedure shown in FIG. 25.

When there is no receiver, a transmitter is requested to perform control for not transmitting electric power or setting transmission power to low power.

Therefore, even after the authentication, the transmitter 20J and the receiver 30J need to periodically perform authentication.

Figure 36:
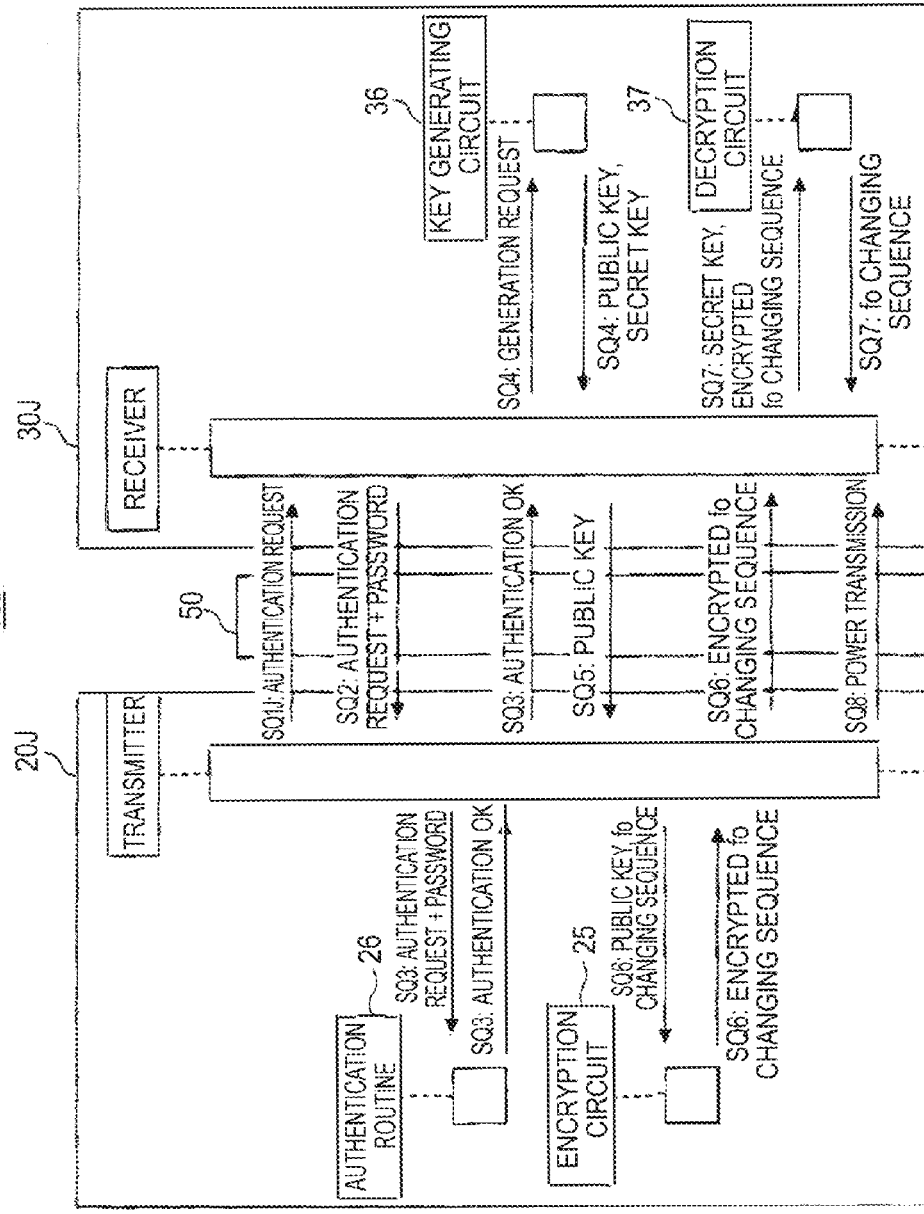
FIG. 36 is a diagram of a wireless power transmission apparatus according to the tenth embodiment including an authentication sequence for periodically performing authentication in the wireless power transmission apparatus.

FIG. 36 is a diagram of a wireless power transmission apparatus according to the tenth embodiment including an authentication sequence for periodically performing authentication in the wireless power transmission apparatus.

The authentication sequence shown in FIG. 36 is different from the authentication sequence shown in FIG. 25 in that, in a sequence SQ1J, an authentication request is started from the transmitter.

<11. Eleventh Embodiment>

Figure 37:
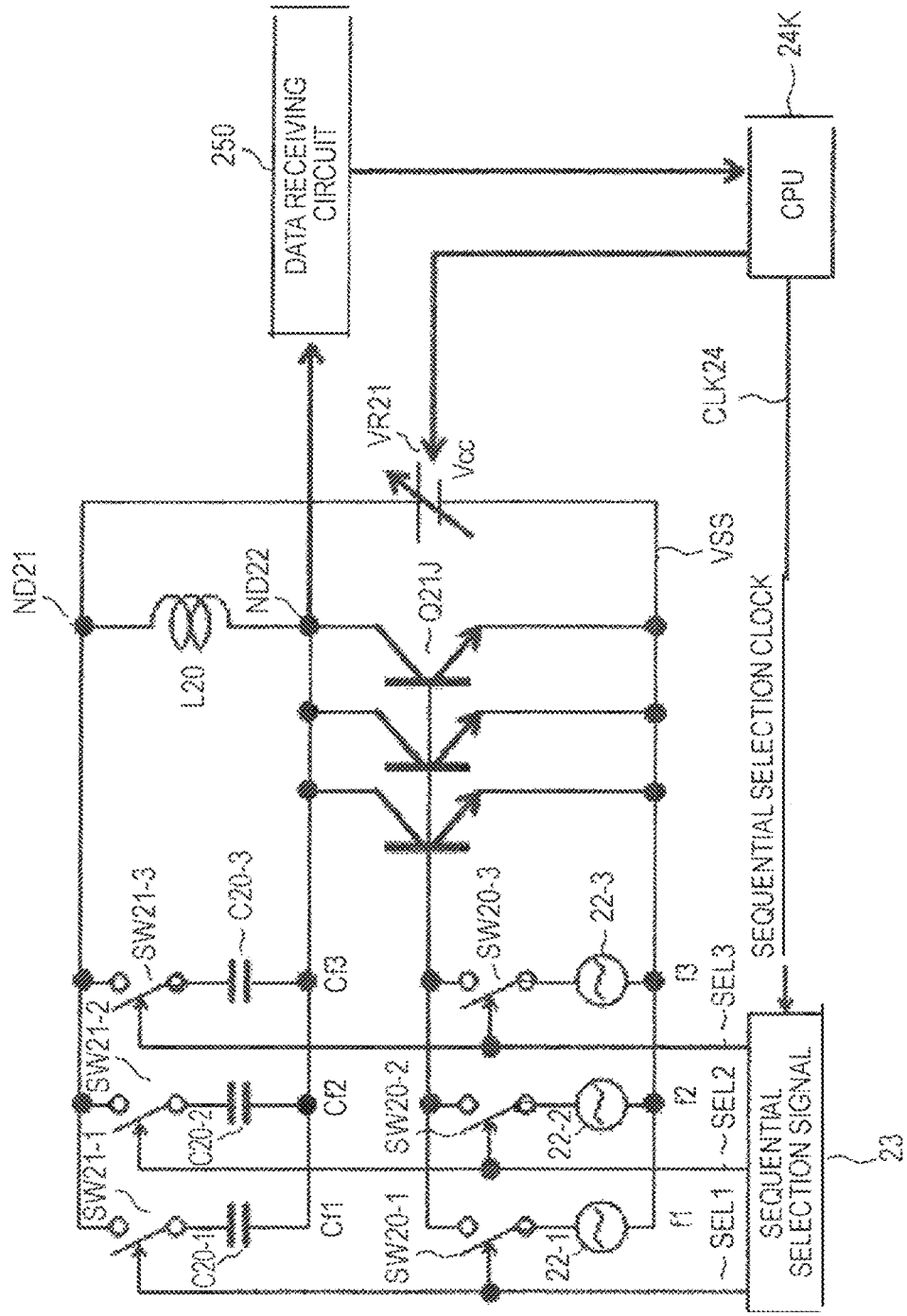
FIG. 37 is a diagram of the configuration of a transmitter according to an eleventh embodiment of the present invention.

FIG. 37 is a diagram of the configuration of a transmitter according to an eleventh embodiment of the present invention.

In the eleventh embodiment, a receiver 30K informs a transmitter 20K of a power demand request.

The transmitter 20K has a function of increasing or reducing transmission power according to the power demand request of one or plural receivers 30K.

The transmitter 20K should not always continue to output electric power when there is no demand. It is desirable in terms of power saving to increase or reduce transmission power according to a demand.

As a simple example, a principle under which the transmitter 20K gradually reduces transmission power as long as no power-up request is transmitted from the receiver 30K is explained below.

The transmitter 20K shown in FIG. 37 is different from the transmitter 20B shown in FIG. 17 in that the transmitter 20K includes a Vcc variable circuit VR21 for increasing or reducing transmission power and a data receiving circuit 250 for receiving a power demand request.

The Vcc variable circuit VR21 increases or reduces the power supply voltage Vcc according to a control signal CTL24K of a CPU 24K.

Figure 38:
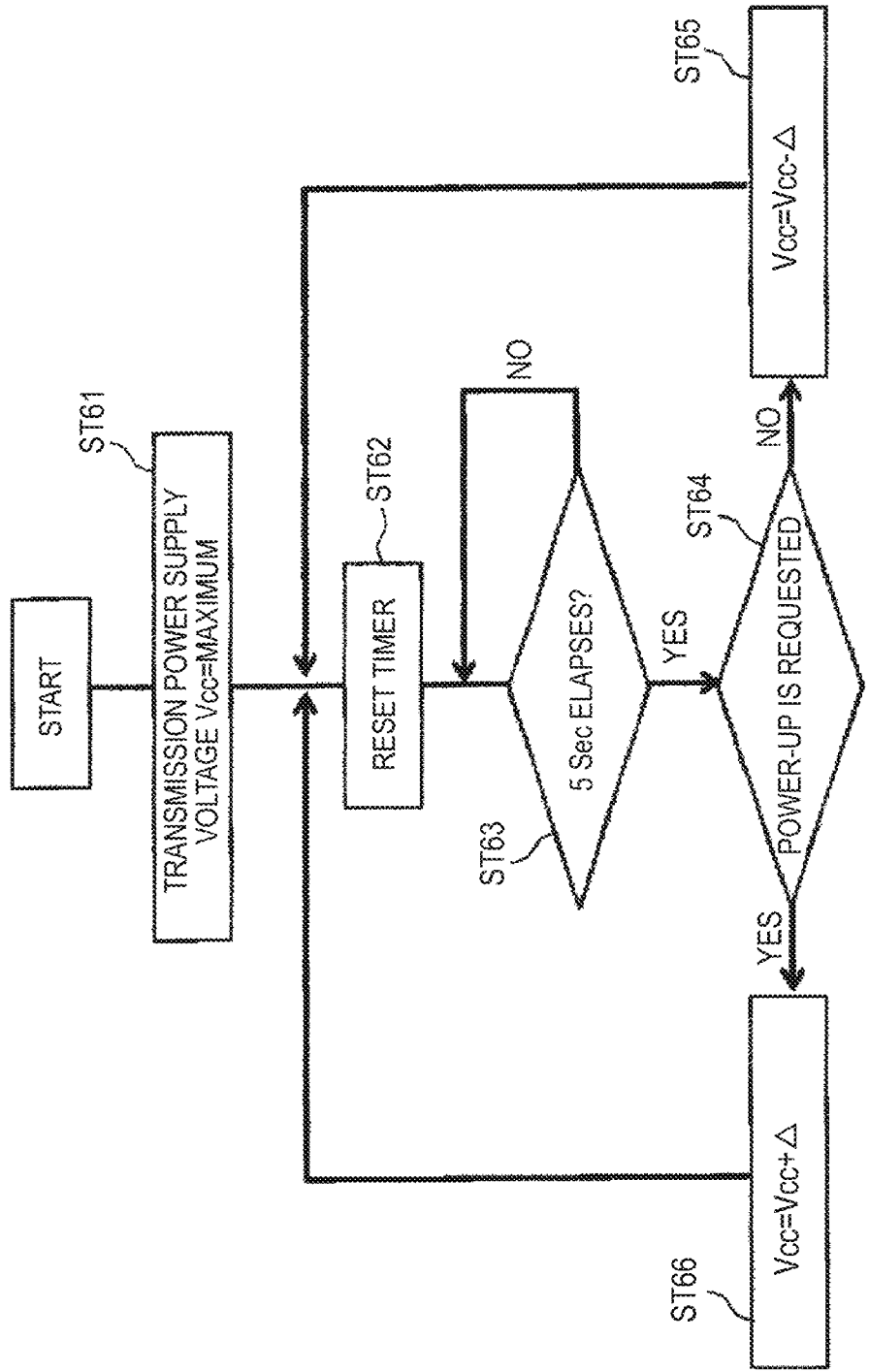
FIG. 38 is a flowchart for explaining control processing for a power supply voltage according to the eleventh embodiment.

FIG. 38 is a flowchart for explaining control processing for a power supply voltage according to the eleventh embodiment.

The CPU 34K maximizes the transmission power supply voltage Vcc (ST61), resets a timer (ST62), and, every five seconds (ST63), when there is no power-up request (ST64), slightly reduces Vcc (ST65).

On the other hand, when there is a power-up request (ST64), the CPU 34K slightly increases Vcc (ST66).

This makes it possible to automatically reduce transmission power to small power when there is no receiver.

<12. Twelfth Embodiment>

Figure 39:
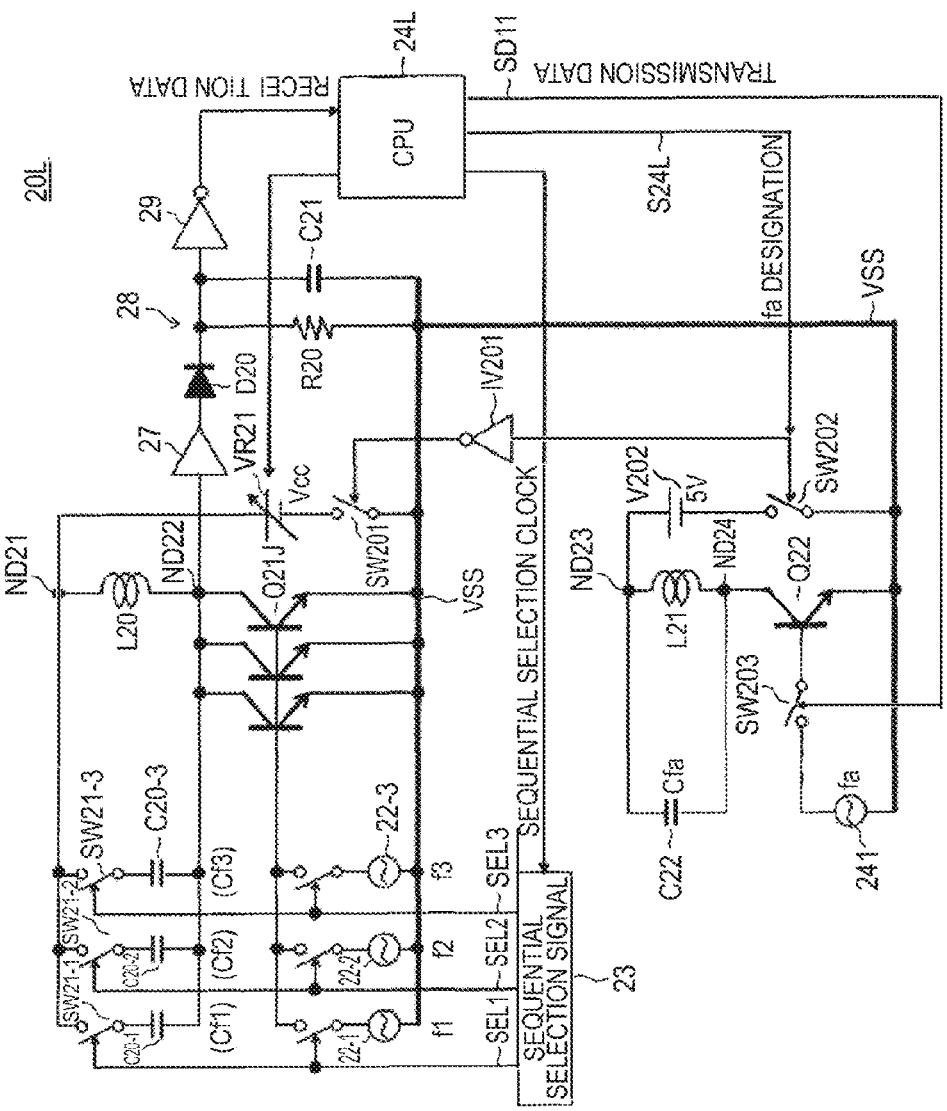
FIG. 39 is a diagram of a configuration example of a transmitter according to a twelfth embodiment of the present invention.

FIG. 39 is a diagram of a configuration example of a transmitter according to a twelfth embodiment of the present invention.

A transmitter 20L according to the twelfth embodiment also has the characteristic configurations of the embodiments explained above.

Since the details of the configurations are explained in the embodiments, explanation of the details is omitted in the twelfth embodiment.

<13. Thirteenth Embodiment>

Figure 40:
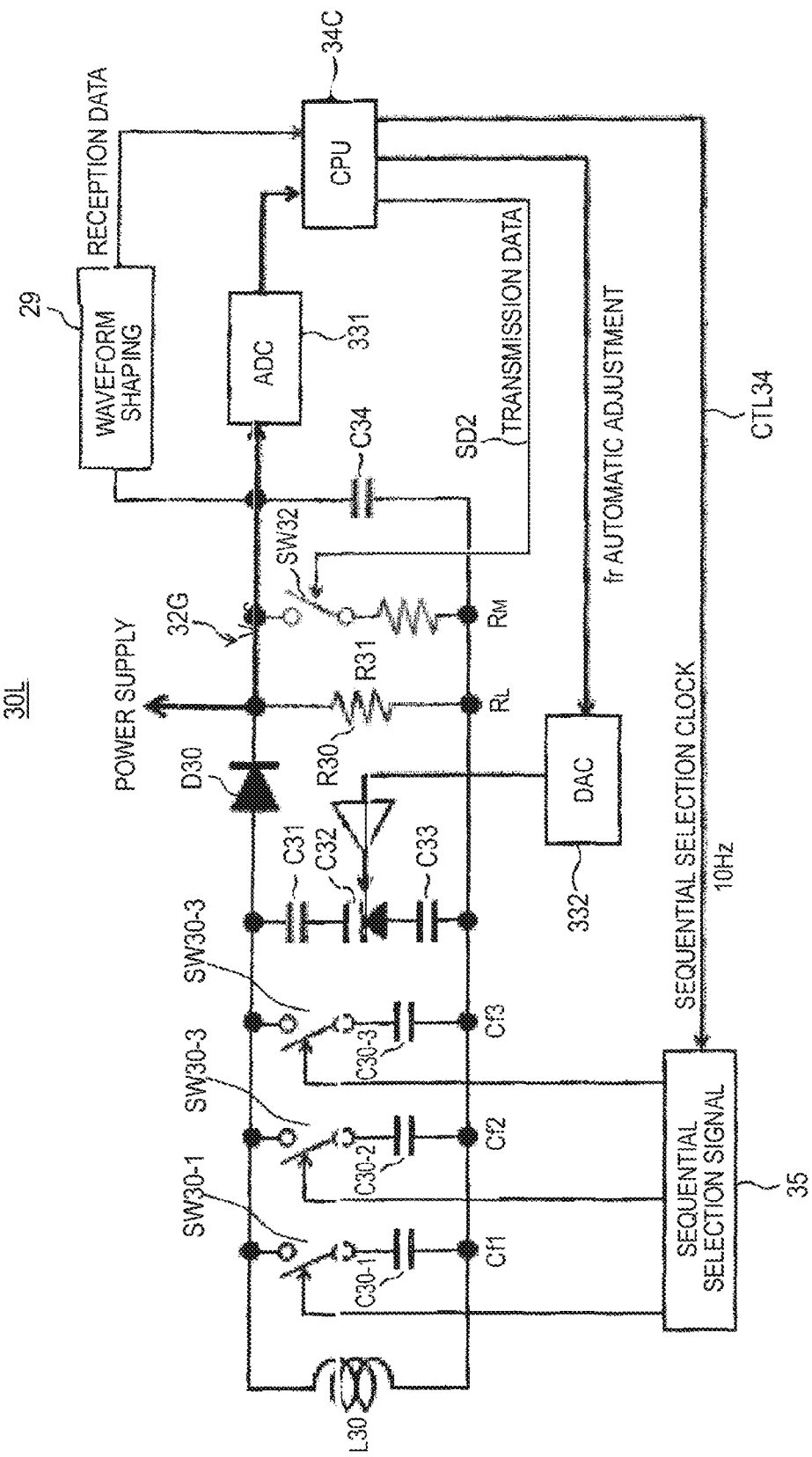
FIG. 40 is a diagram of the configuration of a receiver according to a thirteenth embodiment of the present invention.

FIG. 40 is a diagram of the configuration of a receiver according to a thirteenth embodiment of the present invention.

A receiver 30L according to the thirteenth embodiment also has the characteristic configurations of the embodiments explained above.

Since the details of the configurations are explained in the embodiments, explanation of the details is omitted in the thirteenth embodiment.

<14. Fourteenth Embodiment>

Figure 41:
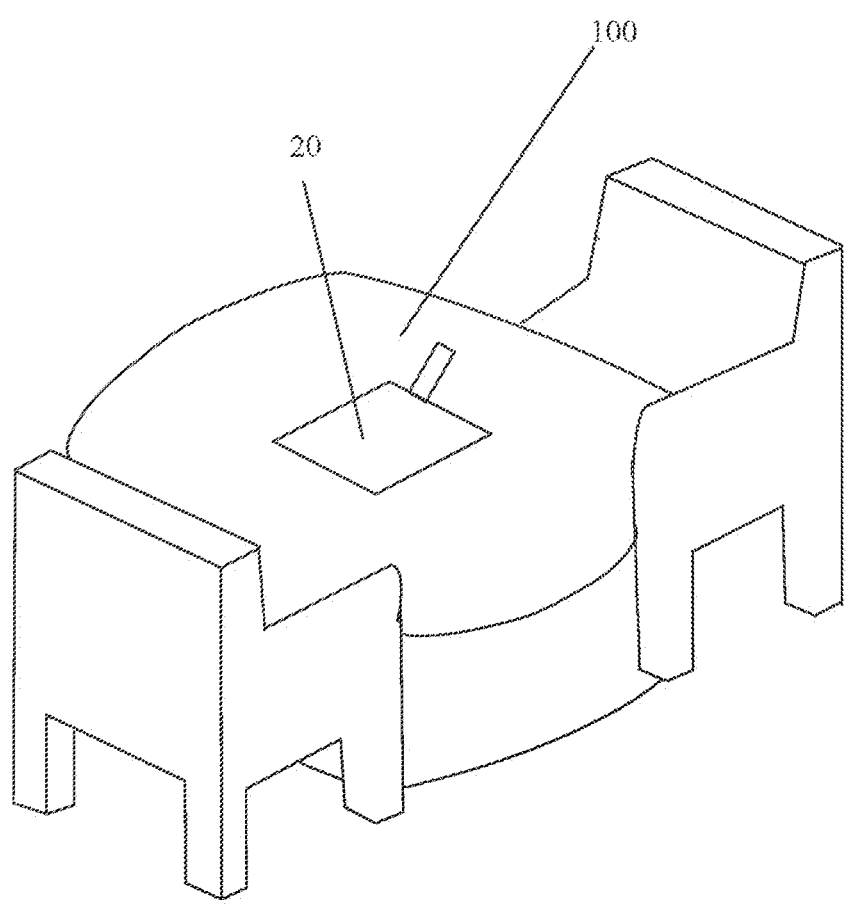
FIG. 41 is a diagram of an example of a table incorporating a transmitter according to a fourteenth embodiment of the present invention.

FIG. 41 is a diagram of an example of a table incorporating a transmitter according to a fourteenth embodiment of the present invention.

As shown in the figure, in the fourteenth embodiment, any one of the transmitters according to the embodiments explained above is incorporated in a table 100.

A user or the like can receive electric power or automatically perform exchange of a modulation signal by bringing a portable electronic apparatus including any one of the receivers explained above close to or placing the portable electronic apparatus on the table 100.

As explained above, according to the embodiments, effects explained below can be obtained.

According to the embodiments, it is possible to suppress influence on unrelated apparatuses present within a wireless power transmission area and prevent a cause of malfunction of the apparatuses.

It is possible to realize one-to-one or one-to-many exclusive wireless power transmission.

It is possible to prevent wireless power supply to a partner to which a user does not desire to feed electric power.

Since a power signal itself is utilized as an authentication channel, it is possible make a dedicated channel for authentication unnecessary and prevent a waste of transmitting electric power regardless of the fact there is no demand.

The present application contains subject matter related to that disclosed in Japanese Priority Patent Application JP 2010-024478 filed in the Japan Patent Office on Feb. 5, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A wireless power reception apparatus comprising:
a receiver configured to receive electric power transmitted from a transmitter while changing a reception resonant frequency of the receiver,
wherein the receiver includes
a rectifying unit configured to rectify the received electric power to a transmission voltage and feed the transmission voltage to an adjusting circuit; and
a control unit configured to control the adjusting circuit, wherein the control unit is configured to adjust the reception resonant frequency to resonant frequency of the transmitted electric power.

2. The wireless power reception apparatus according to claim 1, wherein the resonant frequency of the transmitted electric power is changed based on a set frequency sequence in the transmitter.

3. The wireless power reception apparatus according to claim 2, wherein the set of frequency sequence in the transmitter is undisclosed to the wireless power reception apparatus.

4. The wireless power reception apparatus according to claim 1, wherein the receiver includes an authentication sequence to enable the transmitter to share a frequency sequence and wirelessly transmit data corresponding to the authentication sequence to the receiver.

5. The wireless power reception apparatus according to claim 4, wherein the receiver is configured to encrypt the authentication sequence with a public key, a secret key, or both a public key and a secret key.

6. The wireless power reception apparatus according to claim 4, wherein the receiver is configured to perform the authentication sequence via a power transmission line.

7. The wireless power reception apparatus according to claim 4, wherein the receiver is configured to perform the authentication sequence via a wireless transmission line different from a power transmission line.

8. The wireless power reception apparatus according to claim 4, wherein the receiver is configured to select at least one frequency, fa, at which to execute the authentication sequence.

9. The wireless power reception apparatus according to claim 8, wherein the receiver is configured to (a) execute the authentication sequence at the same frequency fa at which the transmitter executes the authentication sequence, (b) share the frequency sequence with the transmitter, and (c) wirelessly transmit and receive data corresponding to the authentication sequence to and from the transmitter using the frequency fa.

10. The wireless power reception apparatus according to claim 1, wherein the receiver is configured to (a) include an authentication sequence to enable the transmitter to share a set resonant frequency with the receiver, and (b) wirelessly transmit and receive data corresponding to the authentication sequence to and from the transmitter, and the receiver is configured to maintain a low-power mode until the authentication sequence is complete.

11. The wireless power reception apparatus according to claim 1 wherein the receiver is configured to (a) include an authentication sequence to enable the transmitter to share a set of resonant frequency with the receiver, and (b) select at least one frequency, fa, at which to execute the authentication sequence.

12. The wireless power reception apparatus according to claim 1, wherein the receiver is configured to notify the transmitter of a power demand request.

13. The wireless power reception apparatus according to claim 12, wherein the transmitted electric power changes based on the power demand request.

14. The wireless power reception apparatus according to claim 1, wherein the receiver is configured to transmit information to the transmitter.

15. The wireless power reception apparatus according to claim 1, wherein the receiver includes an antenna configured to receive the electric power.

* * * * *